US012318692B2

(12) United States Patent
Wen et al.

(10) Patent No.: US 12,318,692 B2
(45) Date of Patent: Jun. 3, 2025

(54) VIRTUAL OBJECT CONTROL METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Xiaoqing Wen, Shenzhen (CN); Jiaqi Pan, Shenzhen (CN); Ying Deng, Shenzhen (CN); Ke Mao, Shenzhen (CN); Weixiang Yu, Shenzhen (CN); Jing Kou, Shenzhen (CN); Zefeng Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 17/962,465

(22) Filed: Oct. 8, 2022

(65) Prior Publication Data

US 2023/0033874 A1 Feb. 2, 2023

Related U.S. Application Data

(63) Continuation of application No. PCT/CN2021/131969, filed on Nov. 22, 2021.

(30) Foreign Application Priority Data

Dec. 22, 2020 (CN) .......................... 202011529651.1

(51) Int. Cl.
*A63F 13/55* (2014.01)
*A63F 13/533* (2014.01)
*A63F 13/822* (2014.01)

(52) U.S. Cl.
CPC ............ *A63F 13/55* (2014.09); *A63F 13/533* (2014.09); *A63F 13/822* (2014.09); *A63F 2300/308* (2013.01); *A63F 2300/807* (2013.01)

(58) Field of Classification Search
CPC ...... A63F 13/426; A63F 13/35; A63F 13/822; A63F 13/533; A63F 13/55; A63F 2300/308; A63F 2300/807
(Continued)

(56) References Cited

U.S. PATENT DOCUMENTS 5,810,666 A * 9/1998 Mero ........................ A63F 3/08
463/16
2004/0110560 A1 * 6/2004 Aonuma ................. A63F 13/52
463/32
(Continued)

FOREIGN PATENT DOCUMENTS

| CN | 106422329 A | 2/2017 |
|----|-------------|--------|
| CN | 107398071 A | 11/2017 |

(Continued)

OTHER PUBLICATIONS

Justanotherdude09, Iphone version of "Call of Mini Sniper", https://www.youtube.com/watch?v=QybkX5Re-sk, Jul. 3, 2012 (Year: 2012).*
(Continued)

*Primary Examiner* — Michael A Cuff
(74) *Attorney, Agent, or Firm* — ANOVA LAW GROUP, PLLC

(57) ABSTRACT

A virtual object control method includes: displaying a virtual environment screen and a target function control, the target function control being configured to control the first virtual object to perform a target operation which triggers change of a target attribute value of a second virtual object; determining, in response to a trigger operation on the target function control, one or more second virtual objects with target
(Continued)

attribute values satisfying a preset condition as one or more candidate virtual objects, and displaying one or more candidate object identifiers of the one or more candidate virtual objects; and determining, in response to a selection operation on one of the one or more candidate object identifiers, that a selected candidate object identifier is a target object identifier, and controlling the first virtual object to perform the target operation on a target virtual object corresponding to the target object identifier.

20 Claims, 13 Drawing Sheets

(58) Field of Classification Search
USPC .......................................................... 463/31
See application file for complete search history.

(56) References Cited

U.S. PATENT DOCUMENTS

| | | | |
|---|---|---|---|
| 2014/0302935 A1* | 10/2014 | Royce | A63F 13/822 |
| | | | 463/42 |
| 2016/0199728 A1 | 7/2016 | Yoon | |
| 2017/0344214 A1 | 11/2017 | Hartman | |
| 2019/0130656 A1 | 5/2019 | Gebbie et al. | |
| 2020/0282312 A1* | 9/2020 | Hu | A63F 13/58 |
| 2021/0228986 A1* | 7/2021 | Chan | A63F 13/822 |
| 2022/0047941 A1 | 2/2022 | Chen et al. | |

FOREIGN PATENT DOCUMENTS

| | | | |
|---|---|---|---|
| CN | 110064193 | A | 7/2019 |
| CN | 111481932 | A | 8/2020 |
| CN | 111589126 | A | 8/2020 |
| CN | 112494955 | A | 3/2021 |
| JP | 2013073479 | A | 4/2013 |
| JP | 5676036 | B1 | 2/2015 |
| JP | 5729513 | B1 | 6/2015 |
| JP | 2018029821 | A | 3/2018 |
| JP | 2018073230 | A | 5/2018 |
| JP | 2018517449 | A | 7/2018 |

OTHER PUBLICATIONS

The World Intellectual Property Organization (WIPO) International Search Report for PCT/CN2021/131969 Feb. 18, 2022 7 Pages (including translation).

The Japan Patent Office (JPO) Notification of Reasons for Refusal for Application No. 2023-521166 and Translation Mar. 4, 2024 10 Pages.

Korean Intellectual Property Office (KIPO) Office Action for Application No. 2023-7018932 Feb. 6, 2025 52 Pages (including translation).

* cited by examiner

VIRTUAL OBJECT CONTROL METHOD AND APPARATUS, TERMINAL, AND STORAGE MEDIUM

CROSS-REFERENCES TO RELATED APPLICATIONS

This application is a continuation application of PCT Patent Application No. PCT/CN2021/131969, entitled "CONTROL METHOD AND APPARATUS FOR VIRTUAL OBJECT, TERMINAL, AND STORAGE MEDIUM" and filed on Nov. 22, 2021, which claims priority to Chinese Patent Application No. 202011529651.1, entitled "SKILL RELEASE METHOD AND APPARATUS FOR VIRTUAL OBJECT, TERMINAL, AND STORAGE MEDIUM" filed with the China National Intellectual Property Administration on Dec. 22, 2020, the entire contents of both of which are incorporated herein by reference.

FIELD OF THE TECHNOLOGY

Embodiments of the present disclosure relate to the field of computer technologies, and in particular, to a virtual object control method and apparatus, a terminal, and a storage medium.

BACKGROUND OF THE DISCLOSURE

With the development of computer technologies, virtual objects are applied to more and more scenarios. For example, in online games, battle game simulation exercises, and other scenarios, users may be simulated by using virtual objects, and interaction can be conducted between various virtual scenes by performing operations. For example, in a multiplayer online role-playing game, players may control virtual objects with different occupations and attributes to compete or entertain in a virtual world. In the related art, when controlling a virtual object to perform an operation, it is necessary to continuously adjust a region on which the operation acts. However, in the method of performing an operation by acting on a region, virtual objects that need to receive the operation cannot be accurately located, causing the performed operation to achieve below the expected effects, and resulting in a waste of computer resources.

SUMMARY

According to embodiments provided in the present disclosure, a virtual object control method and apparatus, a terminal, and a storage medium are provided.

One aspect of the present disclosure provides a virtual object control method, performed by a computer device, the method including: displaying a virtual environment screen and a target function control, the virtual environment screen comprising a first virtual object and second virtual objects, the target function control being configured to trigger the first virtual object to perform a target operation corresponding to a target function, and the target operation being used for triggering change of a target attribute value of a second virtual object; determining, in response to a trigger operation on the target function control, one or more second virtual objects with target attribute values satisfying a preset condition as one or more candidate virtual objects, and displaying one or more candidate object identifiers of the one or more candidate virtual objects; and determining, in response to a selection operation on one of the one or more candidate object identifiers, that a selected candidate object identifier is a target object identifier, and controlling the first virtual object to perform the target operation on a target virtual object corresponding to the target object identifier.

Another aspect of the present disclosure provides a virtual object control apparatus, including: a processor and a memory, the memory storing at least one instruction, at least one program, a code set, or an instruction set, the at least one instruction, the at least one program, the code set, or the instruction set being loaded and executed by the processor to implement: displaying a virtual environment screen and a target function control, the virtual environment screen comprising a first virtual object and second virtual objects, the target function control being configured to trigger the first virtual object to perform a target operation corresponding to a target function, and the target operation being used for triggering change of a target attribute value of a second virtual object; determining, in response to a trigger operation on the target function control, one or more second virtual objects with target attribute values satisfying a preset condition as one or more candidate virtual objects, and displaying one or more candidate object identifiers of the one or more candidate virtual objects; and determining, in response to a selection operation on one of the one or more candidate object identifiers, that a selected candidate object identifier is a target object identifier, and controlling the first virtual object to perform the target operation on a target virtual object corresponding to the target object identifier.

Another aspect of the present disclosure provides a non-transitory computer-readable storage medium, storing at least one computer program, the computer program being loaded and executed by a processor to implement the virtual object control method according to the foregoing aspects.

Details of one or more embodiments of the present disclosure are provided in the accompanying drawings and descriptions below. Other features, objectives, and advantages of the present disclosure will become apparent from the specification, the accompanying drawings, and the claims.

BRIEF DESCRIPTION OF THE DRAWINGS

To describe technical solutions in embodiments of the present disclosure more clearly, the following briefly introduces accompanying drawings required for describing the embodiments. Apparently, the accompanying drawings in the following description show merely some embodiments of the present disclosure, and a person of ordinary skill in the art may still derive other accompanying drawings according to the accompanying drawings without creative efforts.

DESCRIPTION OF EMBODIMENTS

Figure 1:
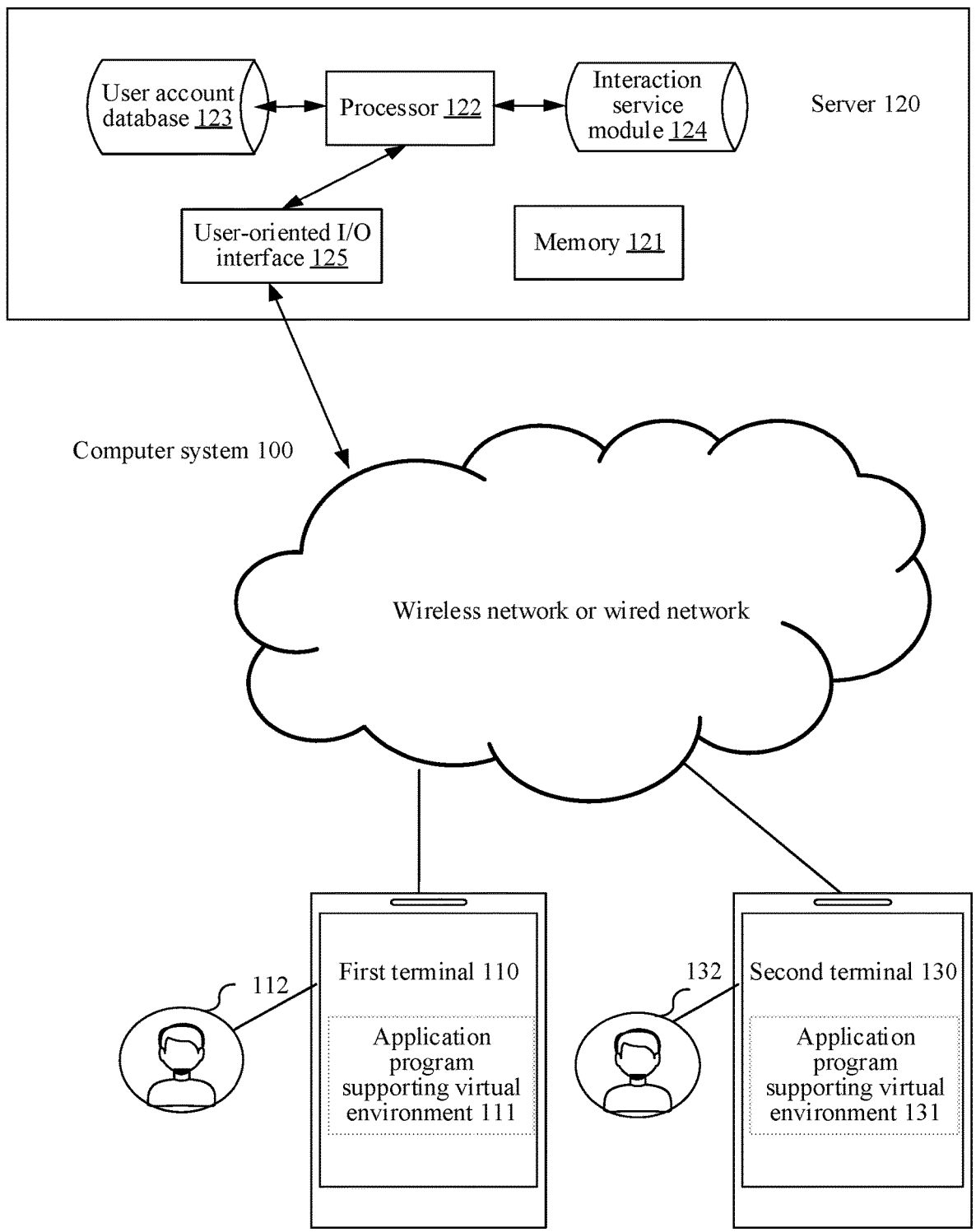
FIG. 1 is a schematic diagram of an implementation environment according to an exemplary embodiment of the present disclosure.

To make the objectives, technical solutions, and advantages of the present disclosure clearer, the following further describes the implementations of the present disclosure in detail with reference to the accompanying drawings.

"Plurality of" mentioned in the specification means two or more. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

First, terms involved in the embodiments of the present disclosure are introduced as follows:
1) Virtual Environment The virtual environment refers to a virtual environment displayed (or provided) by an application program when run on a terminal. The virtual environment may be a simulated environment of the real world, or may be a semi-simulated semi-fictional three-dimensional (3D) environment, or may be an entirely fictional 3D environment. The virtual environment may be any one of a two-dimensional virtual environment, a 2.5-dimensional virtual environment, and a 3D virtual environment. A description is made by using an example in which the virtual environment is a 3D virtual environment in the following embodiments, but this is not limited. In some embodiments, the virtual environment is further used for a battle between at least two virtual characters. In some embodiments, there are virtual resources available to the at least two virtual characters in the virtual environment.
2) Virtual Object The virtual object refers to a movable object in a virtual scene. The movable object may be at least one of a virtual character and a virtual animal, and the virtual character may be, for example, an anime character. In some embodiments, when the virtual scene is a 3D virtual scene, the virtual object may be a 3D model. Each virtual object has a shape and a volume in the 3D virtual scene, and occupies some space in the 3D virtual scene. In some embodiments, the virtual character is a 3D character constructed based on 3D human skeleton technology. The virtual character wears different skins to implement different appearances. In some embodiments, the virtual character may be alternatively implemented by using a 2.5-dimensional model or a two-dimensional model. This is not limited in the embodiments of the present disclosure.

User interface (UI) control: It is any visual control or element that can be seen in a UI of an application program, including but not limited to controls such as a picture, an input box, a text box, a button, and a label. Some UI controls can respond to an operation of a user.

A method provided in the present disclosure may be applied to a virtual reality (VR) application program, a 3D map program, a battle game simulation program, a first-person shooting (FPS) game, a massive multiplayer online role-playing game (MMORPG), and the like. An application in a game is used as an example for description in the following embodiments.

A game based on a virtual environment usually includes maps of one or more game worlds. The virtual environment in the game simulates scenes in the real world. A user may control a virtual object in the game to perform actions in the virtual environment such as walking, running, jumping, shooting, combating, driving, switching to virtual props, and using a virtual prop to attack another virtual object. In addition, the virtual object also has various functions, such as a healing function, where the healing function may change a target attribute value of the virtual object, for example, may change a target attribute value of another virtual object in a same camp. The virtual object may implement a function by performing an operation corresponding to the function, and different functions may correspond to different operations. The virtual object may have a plurality of attributes, and the attributes of the virtual object include but are not limited to attack, defense, speed, intelligence, agility, strength, or health. An attribute value a value of an attribute. For example, an attribute value corresponding to a health attribute is hit points. Some attribute values can be modified, and some attribute values cannot be modified. The target attribute value may include at least one of modifiable attribute values of the virtual object, which may be the hit points.

In the related art, when using a healing function of a virtual object for restoring an attribute value of another virtual object in a team, it is necessary to move an operation-performing position to a position of a target virtual object whose attribute value needs to be restored through an operation such as dragging, or adjust a performing direction of the operation to a direction of the target virtual object, so that the target virtual object is within an operation-performing range.

When the virtual object control method in the related art described above is adopted, a user needs to control an operation-performing region, so that a target virtual object is in the operation-performing region, and then trigger a corresponding operation of a function control to restore an attribute value of the target virtual object. The operation is cumbersome and the operation learning cost is high. When the target virtual object is not aimed, or the target virtual object moves during the operation, the operation acts on a virtual object whose target attribute value does not need to be changed, or the operation acts on an invalid region, thereby resulting in the waste of resources and relatively low operation efficiency of controlling the virtual object to perform the operation.

FIG. 1 shows a schematic diagram of an implementation environment according to an embodiment of the present disclosure. The implementation environment may include: a first terminal 110, a server 120, and a second terminal 130.

An application program 111 supporting a virtual environment is installed and run on the first terminal 110. When the first terminal runs the application program 111, a UI of the application program 111 is generated on a screen of the first terminal 110. The application program 111 may be any one of a battle game simulation program, a multiplayer online battle arena (MOBA) game, a battle royale shooting game, and a simulation game (SLG). In this embodiment, an example in which the application program 111 is an MMORPG is used for description. The first terminal 110 is a terminal used by a first user 112. The first user 112 uses the first terminal 110 to control a first virtual object located in a virtual environment to perform activities, and the first virtual object may be referred to as a main control virtual object of the first user 112. The activities of the first virtual object include, but are not limited to: at least one of adjusting body postures, crawling, walking, running, riding, flying, jumping, driving, picking, shooting, attacking, throwing, and skill casting. Schematically, the first virtual object is a first virtual person such as a simulated person or an anime person.

An application program 131 supporting a virtual environment is installed and run on the second terminal 130. When the second terminal 130 runs the application program 131, a UI of the application program 131 is generated on a screen of the second terminal 130. The client may be any one of a battle game simulation program, a MOBA game, a battle royale shooting game, and an SLG game. In this embodiment, an example in which the application program 131 is an MMORPG is used for description. The second terminal 130 is a terminal used by a second user 132. The second user 132 uses the second terminal 130 to control a second virtual object located in a virtual environment to perform activities, and the second virtual object may be referred to as a main control virtual object of the second user 132. Schematically, the second virtual object is a second virtual person, such as a simulated person or an anime person.

In some embodiments, the first virtual object and the second virtual object are located in a same virtual world. In some embodiments, the first virtual object and the second virtual object may belong to a same camp, a same team, or a same organization, have a friend relationship with each other, or have a temporary communication permission. In some embodiments, the first virtual object and the second virtual object may belong to different camps, different teams, or different organizations, or have a hostile relationship with each other. In this embodiment of the present disclosure, an example in which the first virtual object and the second virtual object belong to the same camp is used for description.

In some embodiments, the application programs installed on the first terminal 110 and the second terminal 130 are the same, or the application programs installed on the two terminals are application programs of a same type on different operating system platforms (Android system or iOS system). The first terminal 110 may generally refer to one of a plurality of terminals, and the second terminal 130 may generally refer to another one of the plurality of terminals. In this embodiment, the first terminal 110 and the second terminal 130 are merely used as an example for description. The device types of the first terminal 110 and the second terminal 130 are the same or different. The device types include: at least one of a smartphone, a tablet computer, an e-book reader, an MP3 player, an MP4 player, a laptop computer, and a desktop computer.

FIG. 1 shows only two terminals. However, a plurality of other terminals may access the server 120 in different embodiments. In some embodiments, one or more terminals are terminals corresponding to a developer. A developing and editing platform for an application program supporting a virtual environment is installed on the terminal. The developer may edit and update the application program on the terminal and transmit an updated application program installation package to the server 120 by using a wired or wireless network. The first terminal 110 and the second terminal 130 may download the application program installation package from the server 120 to update the application program.

The first terminal 110, the second terminal 130, and the another terminal is connected to the server 120 through a wireless network or a wired network.

The server 120 includes at least one of one server, a server cluster including a plurality of servers, a cloud computing platform, and a virtualization center. The server 120 is configured to provide backend services for an application program supporting a 3D virtual environment. In some embodiments, the server 120 is responsible for primary computing work, and the terminal is responsible for secondary computing work; or the server 120 is responsible for secondary computing work, and the terminal is responsible for primary computing work; or the server 120 and the terminal 120 perform collaborative computing by using a distributed computing architecture between each other.

In a schematic example, the server 120 includes a memory 121, a processor 122, a user account database 123, an interaction service module 124, and a user-oriented input/output (I/O) interface 125. The processor 122 is configured to load instructions stored in the server 120, and process data in the user account database 123 and the interaction service module 124. The user account database 123 is configured to store data of user accounts used by the first terminal 110, the second terminal 130, and the other terminals, for example, avatars of the user accounts, nicknames of the user accounts, battle effectiveness indexes of the user accounts, and service zones of the user accounts. The interaction service module 124 is configured to provide interaction functions, for example, to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 via a wireless network or a wired network for data exchange.

Figure 2:
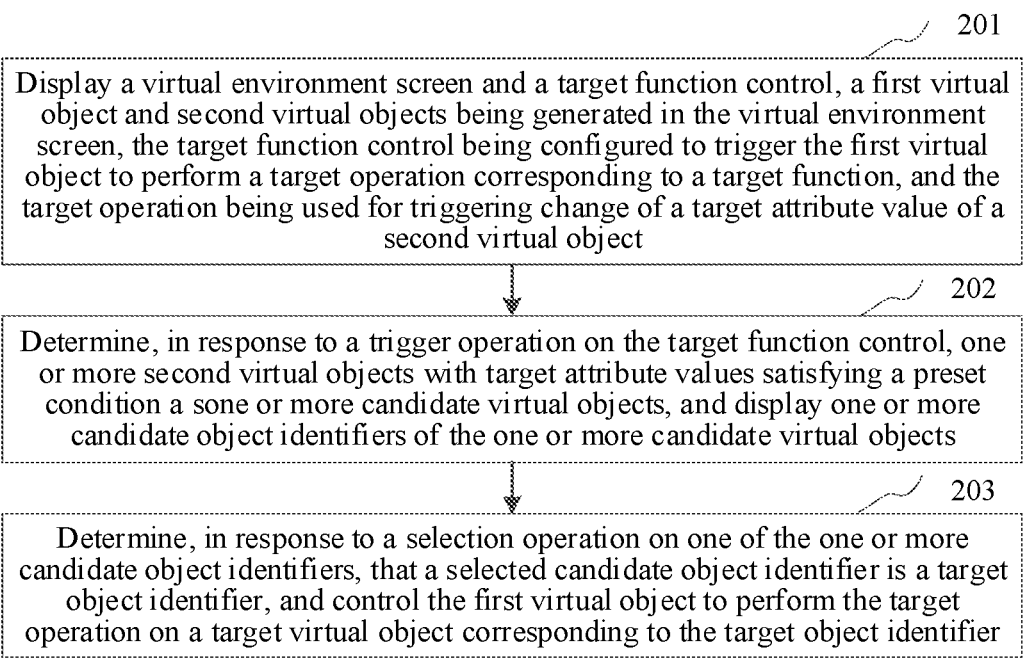
FIG. 2 is a flowchart of a virtual object control method according to an exemplary embodiment of the present disclosure.

FIG. 2 shows a flowchart of a virtual object control method according to an exemplary embodiment of the present disclosure. This embodiment is described by using an example in which the method is applied to the first terminal 110 or the second terminal 130 in the implementation environment shown in FIG. 1 or another terminal in the implementation environment. The method includes the following steps:

Step 201: Display a virtual environment screen and a target function control, a first virtual object and second virtual objects being generated in the virtual environment screen, the target function control being configured to trigger the first virtual object to perform a target operation corresponding to a target function, and the target operation being used for triggering change of a target attribute value of a second virtual object;

The first virtual object and the second virtual objects may belong to a same camp, or may belong to different camps. The target function control is a control configured to implement the target function, and the target function may be implemented by performing the target operation. The virtual environment screen is a screen in a virtual environment.

In some embodiments, the virtual environment screen may be a screen in a virtual environment used in a battle game simulation exercise, the virtual objects in the virtual environment may be fictitious soldiers participating in the exercise, the fictitious soldiers may be displayed on the virtual environment screen, and the fictitious soldiers may interact by performing operations that have specific functions, such as performing operations that can help comrades, so as to provide assistance to the comrades, or performing operations that can fight against enemies, so as to defend against enemy attacks, thereby accomplishing tasks that the soldiers need to complete during the exercise.

The method in this embodiment of the present disclosure is applied in a virtual environment, and the virtual environment includes a first virtual object and second virtual objects. In some embodiments, the virtual environment in this embodiment of the present disclosure may further include a third virtual object, and the third virtual object belongs to a different camp from the first virtual object and the second virtual objects. The third virtual object may change target attribute values of the first virtual object and the second virtual objects in a manner such as performing operations corresponding to a function or using a virtual prop, and the first virtual object changes a target attribute value of a second virtual object by performing an operation corresponding to a function. For example, when the target attribute value is hit points, the first virtual object restores hit points of a second virtual object to a certain extent by performing an operation corresponding to a healing function.

In some embodiments, the terminal generates a virtual environment through a virtual environment screen. In some embodiments, the virtual environment screen is a screen of observing a virtual environment from a perspective of a virtual object. The perspective is an observation angle for observation from a first-person perspective or a third-person perspective of the virtual object in the virtual environment. In some embodiments, in this embodiment of the present disclosure, the perspective is an angle for observing the virtual object by using a camera model in the virtual environment.

In some embodiments, the camera model automatically follows the virtual character in the virtual environment. That is, when a position of the virtual character in the virtual environment changes, a position of the camera model following the virtual character in the virtual environment changes simultaneously, and the camera model is always within a preset distance range from the virtual character in the virtual environment. In some embodiments, in the automatic following process, relative positions of the camera model and the virtual character remain unchanged.

The camera model refers to a 3D model located around the virtual object in the virtual environment. When a first-person perspective is adopted, the camera model is located near a head of the virtual object or is located on the head of the virtual object. When a third-person perspective is used, the camera model may be located behind the virtual object and bound to the virtual object, or may be located at any position that is a preset distance away from the virtual object. The virtual object located in the virtual environment may be observed from different angles through the camera model. In some embodiments, when the third-person perspective is a first-person over-the-shoulder perspective, the camera model is located behind the virtual object (for example, the head and shoulders of a virtual character). In some embodiments, in addition to the first-person perspective and the third-person perspective, the perspective also includes other perspectives, such as a top perspective. When the top perspective is adopted, the camera model may be located above the head of the virtual character. The top perspective is a perspective for observing the virtual environment at an angle from the air. In some embodiments, the camera model is not actually generated in the virtual environment. In other words, the camera model is not generated in the virtual environment generated in the UI. A description is made by using an example in which the camera model is located at any position that is a preset distance away from the virtual object. In some embodiments, one virtual object corresponds to one camera model, and the camera model may rotate with the virtual object as a rotation center. For example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual character may be the head or the torso of the virtual object, or any point around the virtual object. This is not limited in the embodiments of the present disclosure. In some embodiments, when the camera model observes the virtual object, a center of the perspective of the camera model points to a direction from a point on the spherical surface at which the camera model is located to the sphere center.

In some embodiments, the camera model may alternatively observe the virtual object at a preset angle in different directions of the virtual object. In some embodiments, the first virtual object is a virtual object controlled by a user through a terminal, the second virtual objects include at least one of virtual objects controlled by other users and virtual objects controlled by a backend server, and the first virtual object and the second virtual objects belong to a same camp.

In some embodiments, the virtual environment screen in this embodiment of the present disclosure is a screen of observing a virtual environment from a perspective of the first virtual object.

Figure 3:
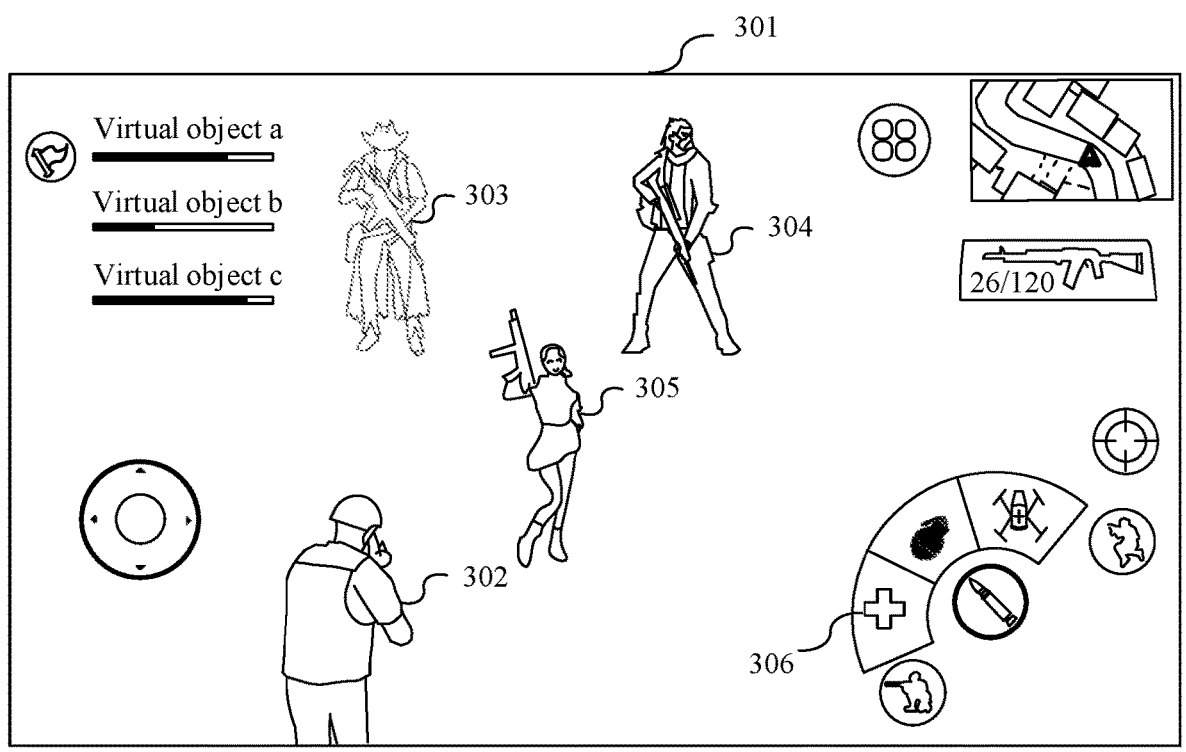
FIG. 3 is a schematic diagram of a virtual environment screen according to an exemplary embodiment of the present disclosure.

Schematically, as shown in FIG. 3, a UI 301 includes a first virtual object 302, three second virtual objects, and a target function control 306. The three second virtual objects are a virtual object a, a virtual object b, and a virtual object c respectively. The virtual object a refers to a virtual object 303, the virtual object b refers to a virtual object 304, and the virtual object c refers to a virtual object 305. Only three second virtual objects are shown in FIG. 3, and in some embodiments, the virtual environment screen may also include more or fewer second virtual objects. Target attribute values of the virtual objects, identifiers of the virtual objects, and other controls are also generated in the UI 301.

Step 202: Determine, in response to a trigger operation on the target function control, one or more second virtual objects with target attribute values satisfying a preset condition as one or more candidate virtual objects, and display one or more candidate object identifiers of the one or more candidate virtual objects.

The trigger operation on the target function control includes, but is not limited to, a click operation, a double-click operation, or a long-press operation. The candidate virtual objects are the second virtual objects with the target attribute values satisfying the preset condition. In some embodiments, in this embodiment of the present disclosure, the preset condition is that a target attribute value is lower than an attribute value threshold. The attribute value threshold may be preset, which may be set as a specific value, or may be set as a percentage. For example, when the attribute value is hit points, and the hit points is represented by blood volume, the attribute value threshold may be 80 points or 80%.

In some embodiments, the terminal monitors the target attribute values of the second virtual objects in real time, and in response to determining that a second virtual object that satisfies the preset condition exists, the target function control is switched from a default state to a quick trigger state. In the default state, the user may select a performing direction of the target operation by triggering the target function control, and control the first virtual object to perform the target operation on the second virtual object in the performing direction and in an operation-performing region. In the quick trigger state, the user may trigger generation of an object identifier of a second virtual object with a target attribute value satisfying the preset condition by triggering the target function control.

In some embodiments, the object identifier includes at least one of a model thumbnail of the virtual object and an account identifier corresponding to the virtual object. The account identifier of the virtual object includes, but is not limited to, a user name and an avatar.

In some embodiments, a candidate object identifier may be generated on a periphery of the target function control, and a generation arrangement may be at least one of horizontal row generation, vertical column generation, or arc generation, which is not limited in this embodiment.

In some embodiments, the trigger operation on the target function control may be at least one of clicking, long-pressing, or double-clicking, so as to trigger the target function control, and then the candidate object identifier is generated. In some embodiments, generation methods of the target function control in the default state and the quick trigger state may be the same or different.

Figure 4:
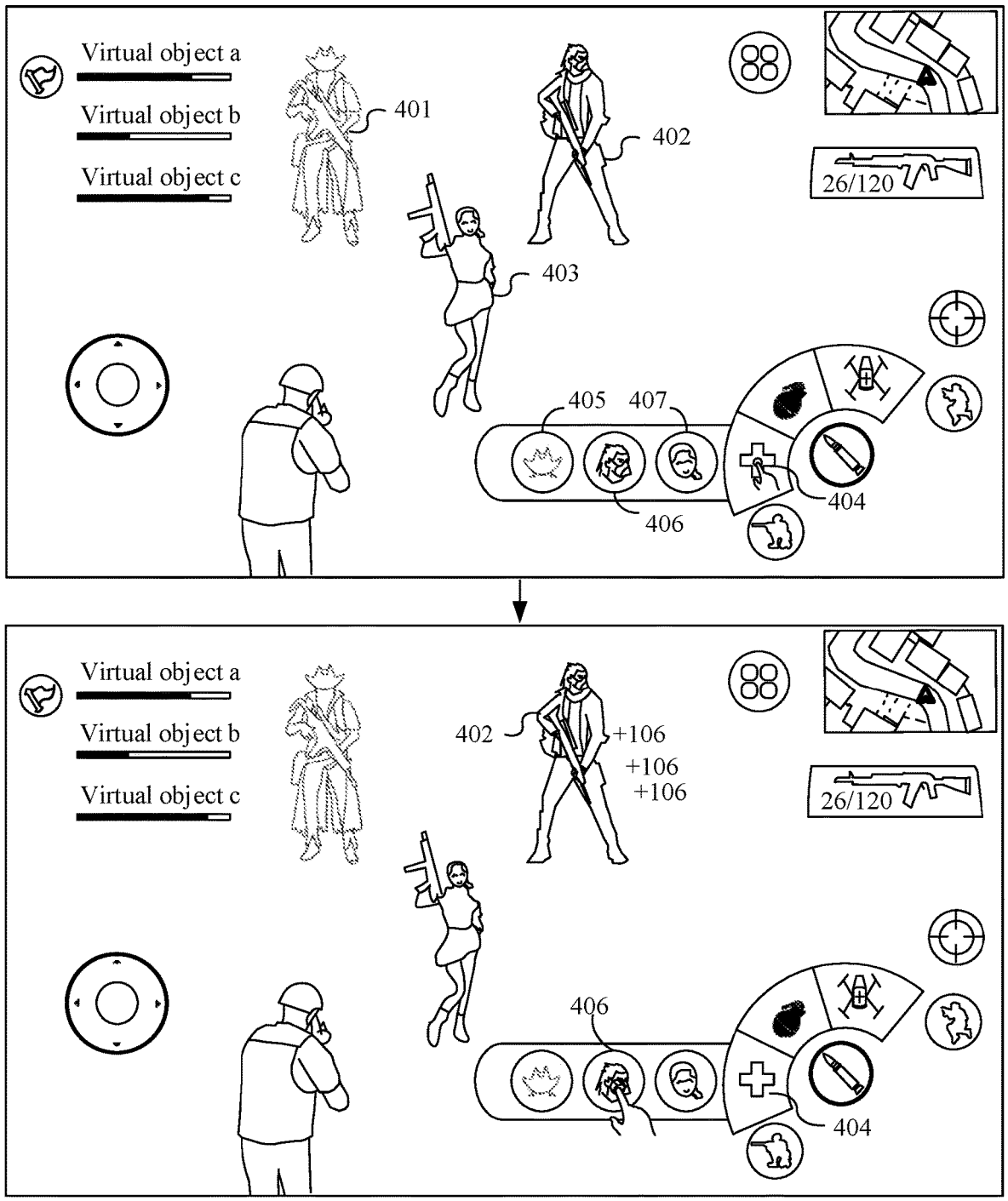
FIG. 4 is a schematic diagram of an implementation of controlling a first virtual object to perform a target operation according to an exemplary embodiment of the present disclosure.

As shown in FIG. 4, when target attribute values of a second virtual object a, a second virtual object b, and a second virtual object c satisfy the preset condition, the terminal switches the target function control 404 in the default state to the quick trigger state. In the quick trigger state, when a trigger operation on the target function control 404 is received, an object identifier 405 of the second virtual object a, an object identifier 406 of the second virtual object b, and an object identifier 407 of the second virtual object c are generated. The virtual object 401 in FIG. 4 is the second virtual object a, the virtual object 402 is the second virtual object b, and the virtual object 403 is the second virtual object c.

Step 203: Determine, in response to a selection operation on one of the one or more candidate object identifiers, that a selected candidate object identifier is a target object identifier, and control the first virtual object to perform the target operation on a target virtual object corresponding to the target object identifier.

An identifier of the target virtual object is the target object identifier, that is, a virtual object identified by the target object identifier is the target virtual object. In some embodiments, the selection operation on the target object identifier may be dragging the target function control to a position at which the target object identifier is located.

In some embodiments, when the target function control is in the default state, the user needs to manually select a performing region of the target operation through the target function control to perform the target operation. When the target function control is in the quick trigger state, the user may trigger the target function control to generate candidate object identifiers. In this case, a target object identifier of the target virtual object whose target attribute value needs to be changed may be selected from the candidate object identifiers. Through the selection operation on the target object identifier, the first virtual object can be controlled to automatically perform the target operation on the target virtual object, without manually selecting the performing region of the target operation. The performing region of the target operation refers to a region on which the target operation acts. The target object identifier is the identifier of the target virtual object. That is, the target virtual object is a virtual object corresponding to the target object identifier.

Schematically, as shown in FIG. 4, when the user triggers (such as clicking, long-pressing, sliding) a target object identifier 406, the first virtual object can perform the target operation on the target virtual object without the need for the user to manually control the target function control 404 to place the target virtual object 402 within the operation-performing region. After the first virtual object performs the target operation on the target virtual object 402, the terminal generates an operation-performing effect on the target virtual object 402, and the operation-performing effect is used for indicating the change amount of a target attribute value of the target virtual object 402. The operation-performing region is a performing region of the target operation.

In this embodiment, when second virtual objects with target attribute values satisfying a preset condition exist, generation of corresponding candidate object identifiers can be triggered through a trigger operation on a target function control. During selection of the candidate object identifiers, a selected candidate object identifier is determined as a target object identifier, and a first virtual object is controlled to perform a target operation on a target virtual object, to change a target attribute value of the target virtual object. Therefore, the target operation is prevented from acting on a second virtual object that does not exist or acting on a second virtual object whose target attribute value does not need to be changed, and the waste of data processing resources and computing resources in a process of human-computer interaction is reduced. In addition, the user may trigger the target operation to be performed on the target virtual object by selecting the target object identifier, which simplifies a process of performing an operation in the human-computer interaction and improves the efficiency and smoothness of the human-computer interaction.

In some embodiments, the trigger operation of the target function control and the selection operation for the target object identifier are consecutive operations. To avoid consecutive operation errors, which causes accidental touches on other candidate object identifiers, in this embodiment, the generation of a candidate object identifier is performed according to a generation priority. The generation priority is used for characterizing a distance between a generated candidate object identifier and the target function control. The higher the generation priority, the closer the generated candidate object identifier is to the target function control, so that the user can easily trigger the target object identifier and control the first virtual object to perform the target operation on the target virtual object.

Figure 5:
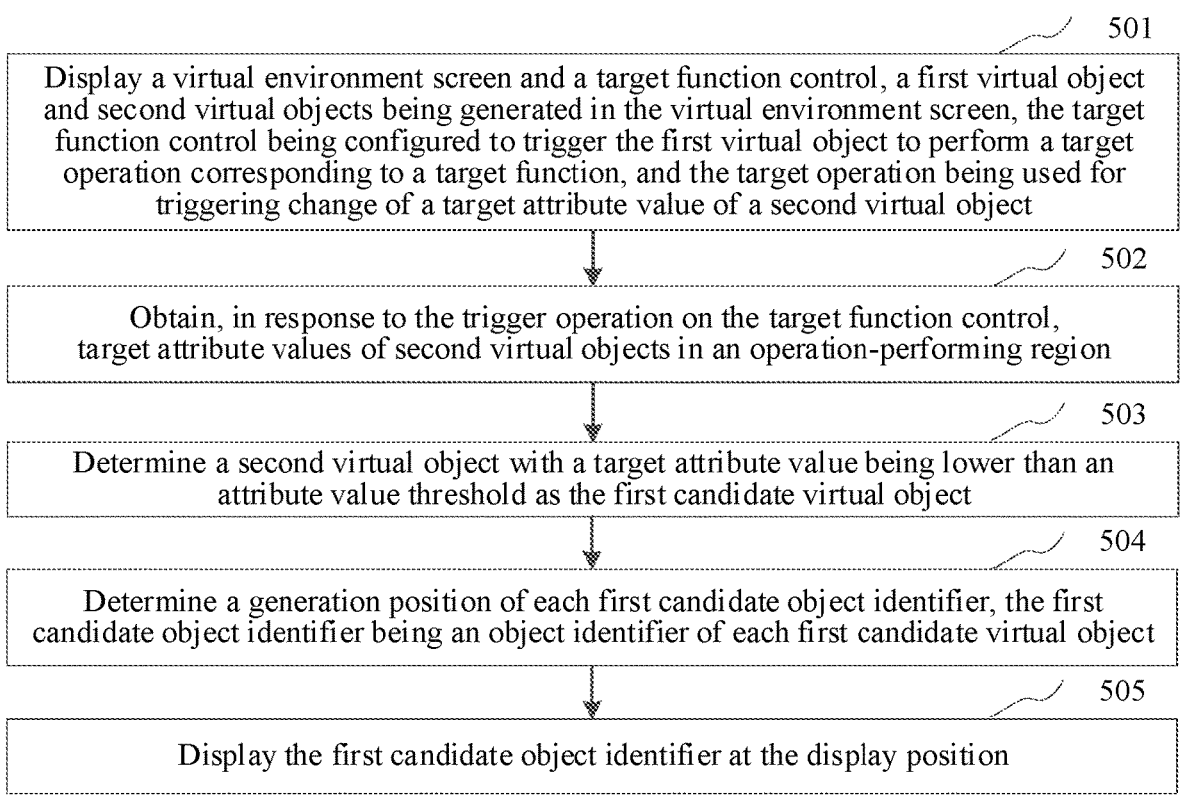
FIG. 5 is a flowchart of a virtual object control method according to another exemplary embodiment of the present disclosure.

FIG. 5 shows a flowchart of a virtual object control method according to an exemplary embodiment of the present disclosure. This embodiment is described by using an example in which the method is applied to the first terminal 110 or the second terminal 130 in the implementation environment shown in FIG. 1 or another terminal in the implementation environment. The method includes the following steps:

Step 501: Display a virtual environment screen and a target function control, a first virtual object and second virtual objects being generated in the virtual environment screen, the target function control being configured to trigger the first virtual object to perform a target operation corresponding to a target function, and the target operation being used for triggering change of a target attribute value of a second virtual object;

For the implementation of the step 501, reference may be made to the step 201 described above.

Step 502: Obtain, in response to the trigger operation on the target function control, target attribute values of second virtual objects in an operation-performing region.

In some embodiments, the target operation includes an operation-performing region, and the target function control controls the first virtual object to perform the target operation on the second virtual objects in the operation-performing region. Therefore, when receiving the trigger operation on the target function control, the terminal obtains the target attribute values of the second virtual objects in the operation-performing region, so as to subsequently determine whether a second virtual object satisfying the preset condition exists.

In some embodiments, the operation-performing region may be a circular range with the first virtual object as a center and a preset length as a radius, or may be a range corresponding to the virtual environment screen currently observed from the perspective of the first virtual object, which is not limited in this embodiment of the present disclosure.

Step 503: Determine a second virtual object with a target attribute value being lower than an attribute value threshold as the first candidate virtual object.

After obtaining the target attribute values of the second virtual objects in the operation-performing region, the terminal may detect whether the target attribute values of the second virtual objects are lower than the attribute value threshold, and when second virtual objects with target attribute values being lower than the attribute value threshold exist, determine the second virtual objects as the first candidate virtual objects. The user may select a target virtual object from the first candidate virtual objects, and change a target attribute value of the target virtual object through a target skill.

Step 504: Determine a display position corresponding to each first candidate object identifier, the first candidate object identifier being an object identifier of each first candidate virtual object.

The display position of the first candidate object identifier refers to a position of a generated first candidate object identifier in an interface. When receiving the trigger operation on the target function control, the terminal generates the first candidate object identifiers of the first candidate virtual objects. The user may control the first virtual object to perform the target operation on the target virtual object corresponding to the target object identifier by selecting the target object identifier in first candidate object identifiers.

In some embodiments, the trigger operation on the target function control may be a long-press operation, the selection operation on the target object identifier may be a drag operation, the position at which the target object identifier is located is an end point of the drag operation, and the long-press operation and the drag operation are consecutive operations.

In some embodiments, when the long-press operation and the drag operation are consecutive operations, if the target function control is far away from an object identifier corresponding to a first candidate virtual object whose target attribute value needs to be changed, the operation may fail, the consecutive operations are interrupted, and the performing of the target operation fails. Therefore, after receiving the trigger operation on the target function control, the terminal may determine a display position corresponding to each first candidate object identifier. For example, the terminal may determine the display position of the first candidate object identifier based on a distance between the first candidate virtual object and the first virtual object, so as to maintain an appropriate distance between the first candidate object identifier and the target function control, thereby reducing the operation error in the process of human-computer interaction and improving the accuracy of the operation.

Step 505: Display the first candidate object identifier at the display position.

In this embodiment, when a trigger operation on a target function control is received, a second virtual object with a target attribute value being lower than an attribute value threshold in an operation-performing region is determined as a first candidate virtual object, before an object identifier is generated, a generation priority of a first candidate object identifier is first determined, and a display position is determined based on the generation priority. Therefore, a selection operation of a user for a target object identifier can be accelerated, the performing efficiency of operations can be improved, accidental touches on other candidate object identifiers during a trigger process can be reduced, and the waste of data processing resources and computing resources in a human-computer interaction process can be reduced.

In some embodiments, the determining a display position corresponding to each first candidate object identifier includes:

Step 1: Obtain distances between the first candidate virtual objects and the first virtual object as a first object distance, and determine a generation priority of the first candidate object identifiers, the generation priority being determined based on at least one of the target attribute values of the first candidate virtual objects, the first object distance, and a current game score of the first candidate virtual objects.

In some embodiments, the display position may be determined based on the generation priority. The generation priority may be determined based on the target attribute value of the first candidate virtual object. The target attribute value is negatively correlated with the generation priority. When the target attribute value of the first candidate virtual object is lower, the corresponding generation priority of the first candidate object identifier is higher. For example, currently existing first candidate virtual objects satisfying a preset condition include a second virtual object A, a second virtual object B, and a second virtual object C. The blood volume of the second virtual object A is 50%, the blood volume of the second virtual object B is 80%, and the blood volume of the second virtual object C is 20%. Then, a generation priority of object identifiers corresponding to the second virtual objects A, B, and C is C>A>B.

In some embodiments, the generation priority may also be determined based on the first object distance between the candidate virtual objects and the first virtual object. After receiving a trigger operation on a target function control, the terminal obtains coordinate information of all first candidate virtual objects in a virtual environment at this time, and then obtains a first object distance between the first candidate virtual objects and the first virtual object according to the coordinate information. The first object distance is negatively correlated with the generation priority, that is, the closer the distance to the first virtual object, the higher the generation priority.

In some embodiments, the generation priority may also be determined based on a current game score of the first candidate virtual objects. The current game score may represent the game combat effectiveness of the first candidate virtual objects. The game combat effectiveness of different first candidate virtual objects have different effects on a game result. Therefore, when controlling the first virtual object to perform the target operation, the user may consider, based on the game combat effectiveness, an action object on which the target operation is to be performed.

In some embodiments, the generation priority is positively correlated with the current game score. For example, when the current game score of the first candidate virtual object is higher, the generation priority is higher. In some embodiments, the terminal may determine the current game score by obtaining a current game attribute of each first candidate virtual object. The current game attribute may include at least one of a quantity of defeated virtual objects, a battle level, and an equipment attribute. The quantity of defeated virtual objects, the battle level, and the equipment attribute are positively correlated with the current game score, that is, the higher the quantity of defeated virtual objects, the higher the current game score; the higher the battle level, the higher the current game score; and the higher the equipment attribute, the higher the current game score.

In some embodiments, the generation priority of each first candidate object identifier may be determined based on at least one option in the foregoing manner. When a plurality of options are combined to determine the generation priority, the generation priority may be determined according to weights of different options. Weight values corresponding to different options may be set by the user or may be preset. For example, the weight values may be simultaneously determined based on the target attribute value of the first candidate virtual object and the current game score, a weight of the target attribute value is 60%, and a weight of the current game score is 40%.

Step 2: Determine the display position corresponding to each first candidate object identifier based on the generation priority, a distance from the display position to the target function control being positively correlated with the generation priority.

After the generation priority of the first candidate object identifier is determined, the display position is determined according to the generation priority. Because the long-press operation on the target function control and the drag operation on the target object identifier are consecutive operations, the distance from the display position to the target function control is positively correlated with the generation priority.

That the distance from the display position to the target function control is positively correlated with the generation priority means that the higher the generation priority, the closer the distance from the display position to the target function control, and the lower the generation priority, the farther the distance from the display position to the target function control. In the foregoing embodiment, because a generation priority is determined based on at least one of: target attribute values of first candidate virtual objects, a first object distance, or a current game score, the generation priority fully considers cases of a first candidate virtual object, which improves the accuracy of the generation priority. In addition, a distance from a display position to a target function control is positively correlated with the generation priority, the higher the generation priority, the closer the distance from the display position to the target function control. Therefore, when a long-press operation and a drag operation are consecutive operations, an object identifier corresponding to the first candidate virtual object whose target attribute value needs to be changed can be closer to the target function control. In this way, a success rate of performing a target operation in a process of human-computer interaction is increased, repeated operations are avoided, and a probability of wasting computing resources is reduced.

In some embodiments, the method further includes: receiving an attribute value reply request transmitted by a server, the attribute value reply request being initiated by a terminal corresponding to a second virtual object through the server, and the attribute value reply request including a request object identifier, where the determining a generation priority of the first candidate object identifiers includes: determining the request object identifier as a highest generation priority when the trigger operation on the target function control is received within a preset duration after the attribute value reply request is received, and the request object identifier belongs to the first candidate object identifiers.

The attribute value reply request includes a request object identifier. The request object identifier refers to a second virtual object triggering the attribute value reply request. The attribute value reply request is used for requesting to obtain a target operation, that is, to request the first virtual object to perform the target operation on the second virtual object triggering the attribute value reply request.

The terminal may determine the generation priority of the first candidate virtual object based on the attribute value reply request of the first candidate virtual object. In some embodiments, when the target attribute value of the second virtual object needs to be changed, a terminal corresponding to the second virtual object may transmit an attribute value reply request to a server, the server may forward the attribute value reply request to a terminal of the first virtual object, and the attribute value reply request includes a request object identifier. The request object identifier refers to a second virtual object triggering the attribute value reply request.

After the attribute value reply request is received, and when a trigger operation on a target function control is received within a preset duration, the terminal detects whether the request object identifier belongs to the first candidate object identifiers, and if yes, determines the request object identifier as a highest generation priority.

In some embodiments, when a plurality of second virtual objects transmit attribute value reply requests, and corresponding request object identifiers all belong to first candidate object identifiers, then the generation priority is determined according to request times of the attribute value reply requests, and a request object identifier included in the attribute value reply requests with an earliest request time is determined as the highest generation priority.

Figure 8:
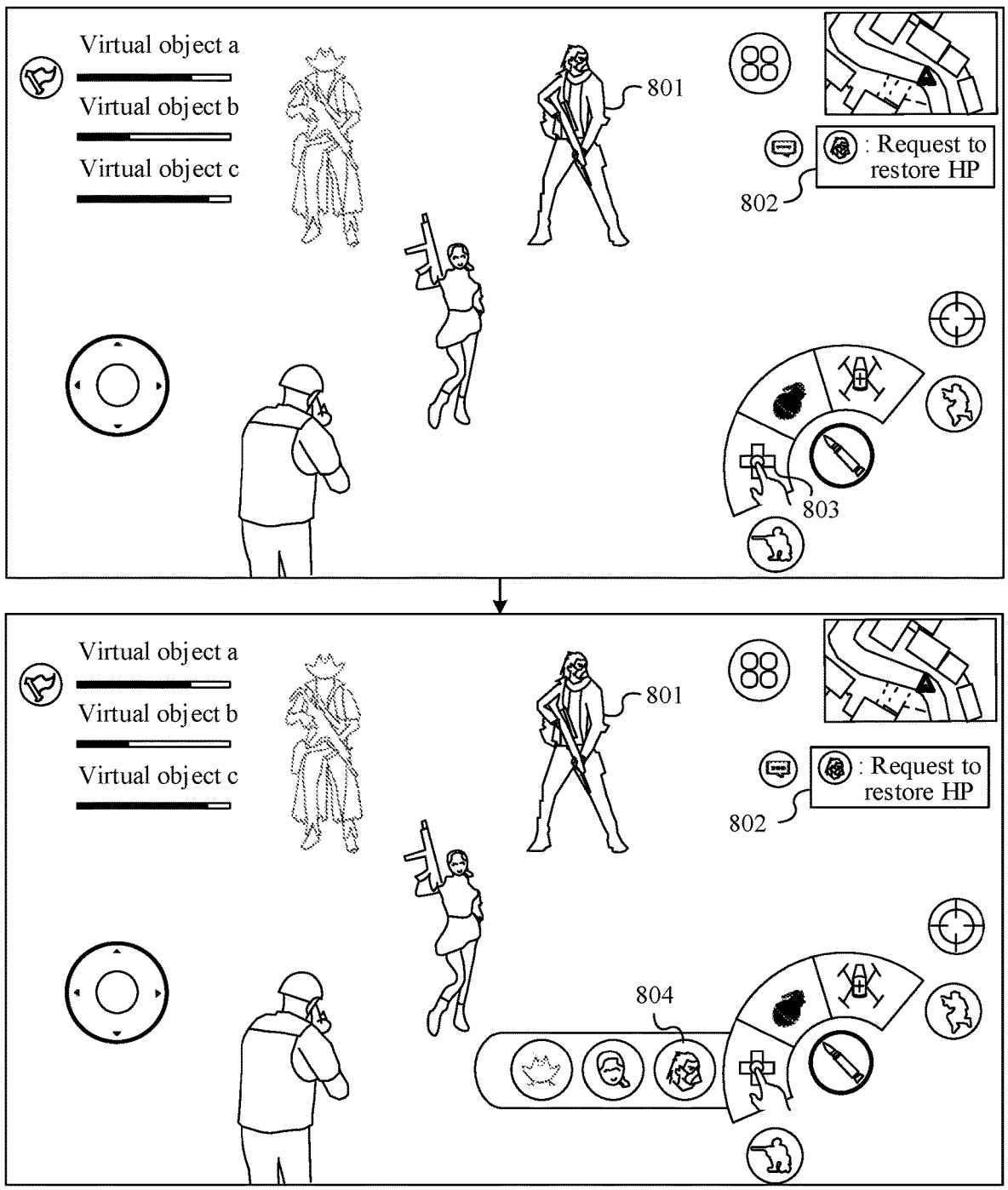
FIG. 8 is a schematic diagram of generation of a candidate object identifier according to another exemplary embodiment of the present disclosure.
Figure 9:
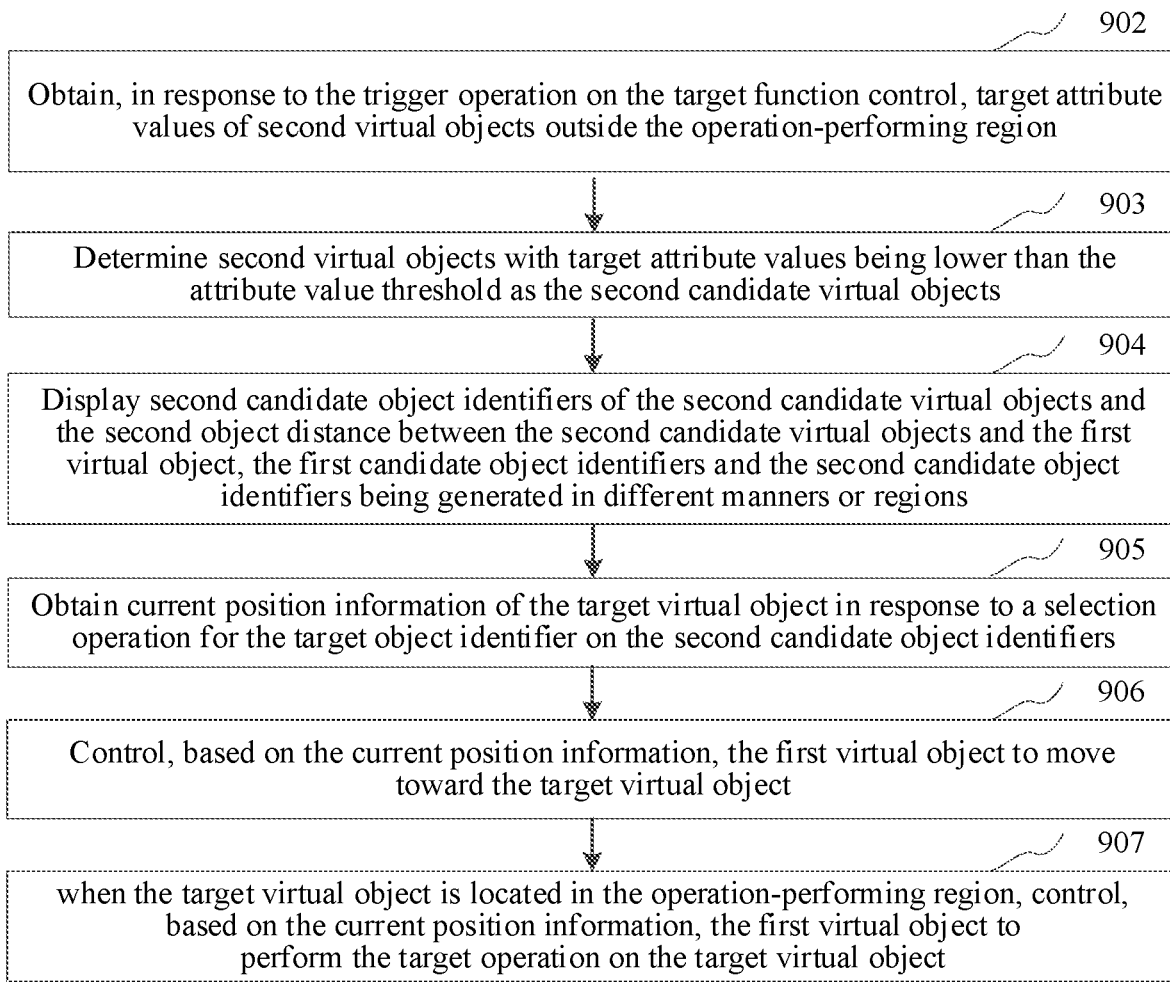
FIG. 9 is a flowchart of a virtual object control method according to another exemplary embodiment of the present disclosure.

Schematically, as shown in FIG. 8, an attribute value reply request 802 of a second virtual object 801 is generated in a virtual environment screen. When the second virtual object 801 is a first candidate virtual object, the terminal receives an operation on a target function control 803. When generation of a first candidate object identifier is triggered, an object identifier 804 corresponding to the second virtual object 801 has a highest generation priority and is closest to the target function control 803.

In the foregoing embodiment, when a trigger operation on a target function control is received within a preset duration after an attribute value reply request is received, and a request object identifier belongs to a first candidate object identifier, the request object identifier is determined as a highest generation priority. Therefore, a target operation can be performed on a second virtual object that actively requests the target operation, so that the target operation can be performed on the second virtual object that is urgently needed, the effectiveness of the operation is improved, and data processing resources and computing resources in a process of human-computer interaction are saved.

In some embodiments, the generating the first candidate object identifier at the display position includes: generating the first candidate object identifier and object information of the first candidate virtual object at the display position, the object information including at least one of the target attribute value, the first object distance, and the current game score.

The target attribute value may be generated on a periphery of the object identifier, and the generation method may be circular generation, strip generation, or generation in digital form. The first object distance and the current game score may be generated in digital form on the periphery of the object identifier. When a plurality of types of object information are generated, display positions of different object information may be different, for example, display positions of the target attribute value, the first object distance, and the current game score may be different.

Figure 6:
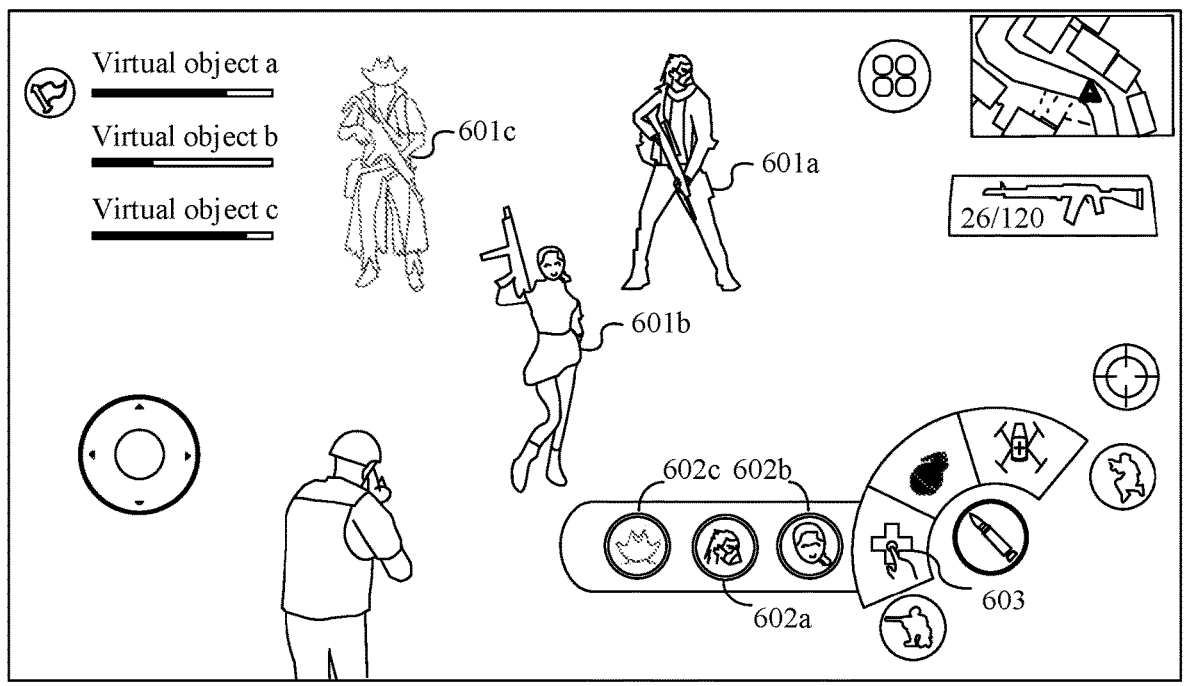
FIG. 6 is a schematic diagram of generation of a candidate object identifier according to an exemplary embodiment of the present disclosure.

As shown in FIG. 6, the first candidate virtual objects include a second virtual object a, a second virtual object b, and a second virtual object c, a virtual object 601a in FIG. 6 refers to the second virtual object a, a virtual object 601b refers to the second virtual object b, a virtual object 601c refers to the second virtual object c, and the object identifier includes: an object identifier 602a corresponding to the second virtual object a, an object identifier 602b corresponding to the second virtual object b, and an object identifier 602c corresponding to the second virtual object c, where a target attribute value of the second virtual object b<a target attribute value of the second virtual object a<a target attribute value of the second virtual object c. Therefore, a generation priority of the object identifier is the object identifier 602b>the object identifier 602a>the object identifier 602c. During generation, a distance between the object identifier 602b and the target function control 603<a distance between the object identifier 602a and the target function control 603<a distance between the object identifier 602c and the target function control 603. In addition, the target attribute value is also generated at the display position of the object identifier, which is generated in the form of a surrounding identifier.

In the foregoing embodiment, a first candidate object identifier and object information of a first candidate virtual object are generated at a display position, so that object information of a candidate virtual object can be obtained intuitively. Therefore, it is convenient to determine a target object identifier, the efficiency of determining the target object identifier from first candidate object identifiers is improved, the computing time required for achieving such a result is reduced, and computing resources are saved.

In some embodiments, the determining, in response to a selection operation on the candidate object identifiers, that a selected candidate object identifier is a target object identifier, and controlling the first virtual object to perform the target operation on a target virtual object corresponding to the target object identifier includes: determining, in response to a selection operation on the first candidate object identifiers, that a selected first candidate object identifier is the target object identifier, and obtaining current position information of the target virtual object corresponding to the target object identifier; and controlling, based on the current position information, the first virtual object to perform the target operation on the target virtual object.

Because the target operation is a range-type operation and has a specific action range, when receiving the selection operation for the target object identifier on the first candidate object identifiers, the terminal may obtain the current position information of the target virtual object.

In some embodiments, when the terminal receives a long-press operation on the target function control, first candidate object identifiers are generated, and the terminal may detect an end position of a drag operation on the target function control, determine a first candidate object identifier at the end position as the target object identifier, and obtain the current position information of the target virtual object. In response to detecting that the first candidate object identifier does not exist at the end position, the target operation fails to be performed, and the first candidate object identifiers disappear. After obtaining the current position information of the target virtual object, the terminal controls the first virtual object to perform the target operation on the target virtual object, without the need for the user to manually adjust the performing region of the target operation to perform the target operation on the target virtual object.

In some embodiments, after performing the target operation on the target virtual object, the target function control enters a cooldown state, and in the cooldown state, the target function control cannot be triggered. After the cooling down for a preset duration, the target function control returns to a triggerable state.

Figure 7:
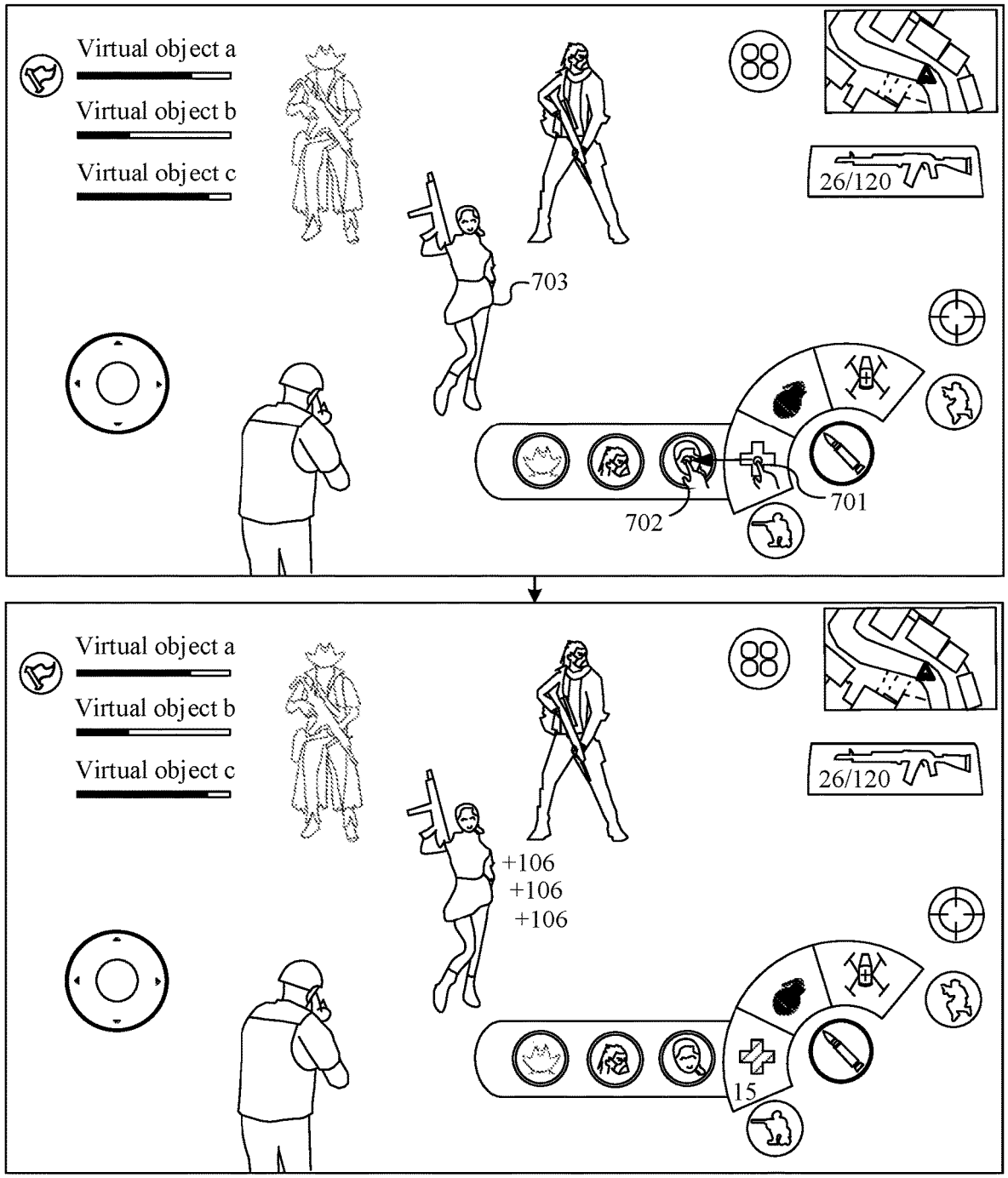
FIG. 7 is a schematic diagram of a process of an implementation of controlling a first virtual object to perform a target operation according to another exemplary embodiment of the present disclosure.

Schematically, as shown in FIG. 7, when a long-press operation on a target function control 701 is received, and an end position of a drag operation is an object identifier 702 in first candidate object identifiers, the terminal obtains position information of a second virtual object 703 corresponding to the object identifier 702, and performs a target operation on the second virtual object 703 based on the position information. In addition, after a target operation is performed, the second virtual object 703 generates an operation-performing effect on a periphery, the target function control 701 enters a cooldown state, and a cooldown duration is 15 s.

In the foregoing embodiment, current position information of a target virtual object corresponding to a target object identifier is obtained, and based on the current position information, a first virtual object is controlled to perform a target operation on the target virtual object. Because a position of the target virtual object may change, through the current position information of the target virtual object, the first virtual object is controlled to perform the target operation on the target virtual object, so that the target operation can be performed based on a current position of the target virtual object, which improves the accuracy of the operation and saves computer resources.

In an application scenario, a second virtual object outside an operation-performing region whose target attribute value needs to be changed may exist. In this case, a user needs to manually control a first virtual object to move to a target virtual object whose target attribute value needs to be changed, and adjust an operation-performing direction to perform a target operation on the target virtual object. In this process, because a position of the first virtual object and the operation-performing direction needs to be manually adjusted, the operation is cumbersome, and it is easy to cause the target operation to act on other positions, resulting in a waste of resources. Therefore, in some embodiments, the first virtual object may be automatically controlled to perform the target operation by selecting an object identifier of the second virtual object outside the operation-performing region, so as to improve the operation-performing efficiency and reduce the waste of resources. In some embodiments, the candidate virtual object further includes second candidate virtual objects, and the determining, in response to a trigger operation on the target function control, one or more second virtual objects with target attribute values satisfying a preset condition as one or more candidate virtual objects, and displaying one or more candidate object identifiers of the one or more candidate virtual objects; further includes:

Step 902: Obtain, in response to the trigger operation on the target function control, target attribute values of second virtual objects outside the operation-performing region.

In some embodiments, when a trigger operation on a target function control is received, in addition to generating an object identifier of a candidate virtual object within an operation-performing region, an object identifier of a candidate virtual object outside the operation-performing region may also be generated, and a user may change a target attribute value of a second virtual object outside the operation-performing region through a selection operation on the object identifier.

Therefore, after receiving the trigger operation on the target function control, the terminal obtains the target attribute values of the second virtual objects outside the operation-performing region, and determines whether the target attribute values of the second virtual objects satisfy a preset condition.

Step 903: Determine second virtual objects with target attribute values being lower than the attribute value threshold as the second candidate virtual objects.

The second virtual objects with the target attribute values being lower than the attribute value threshold and are in the operation-performing region are the first candidate virtual objects, and the object identifier of the first candidate virtual object is the first candidate object identifier. The second virtual objects with the target attribute values being lower than the attribute value threshold and are outside the operation-performing region is the second candidate virtual objects, and the object identifier of the second candidate virtual object is the second candidate object identifier.

In some embodiments, the terminal determines the second virtual objects with the target attribute values being lower than the attribute value threshold in the second virtual objects outside the operation-performing region as the second candidate virtual objects.

Step 904: Display second candidate object identifiers of the second candidate virtual objects and the second object distance between the second candidate virtual objects and the first virtual object, the first candidate object identifiers and the second candidate object identifiers being displayed in different manners or regions.

After determining the second candidate virtual objects, the terminal generates the second candidate object identifiers of the second candidate virtual objects. Because the second candidate virtual objects are located outside the operation-performing region, in some embodiments, when the second candidate object identifiers are generated, the second object distance between the second candidate virtual objects and the first virtual object is simultaneously generated. In some embodiments, a display position of a second candidate object identifier may also be determined based on a generation priority. For the determining method of the generation priority, reference may be made to the determining method of the generation priority of the first candidate object identifiers in the foregoing embodiment.

In some embodiments, for the user to clearly distinguish the candidate virtual object in the operation-performing region and the candidate virtual object outside the operation-performing region, the first candidate object identifier and the second candidate object identifier are generated in different manners or regions.

In some embodiments, the first candidate object identifier and the second candidate object identifier may be distinguished by at least one of the generation size, generation color, or generation brightness.

Figure 10:
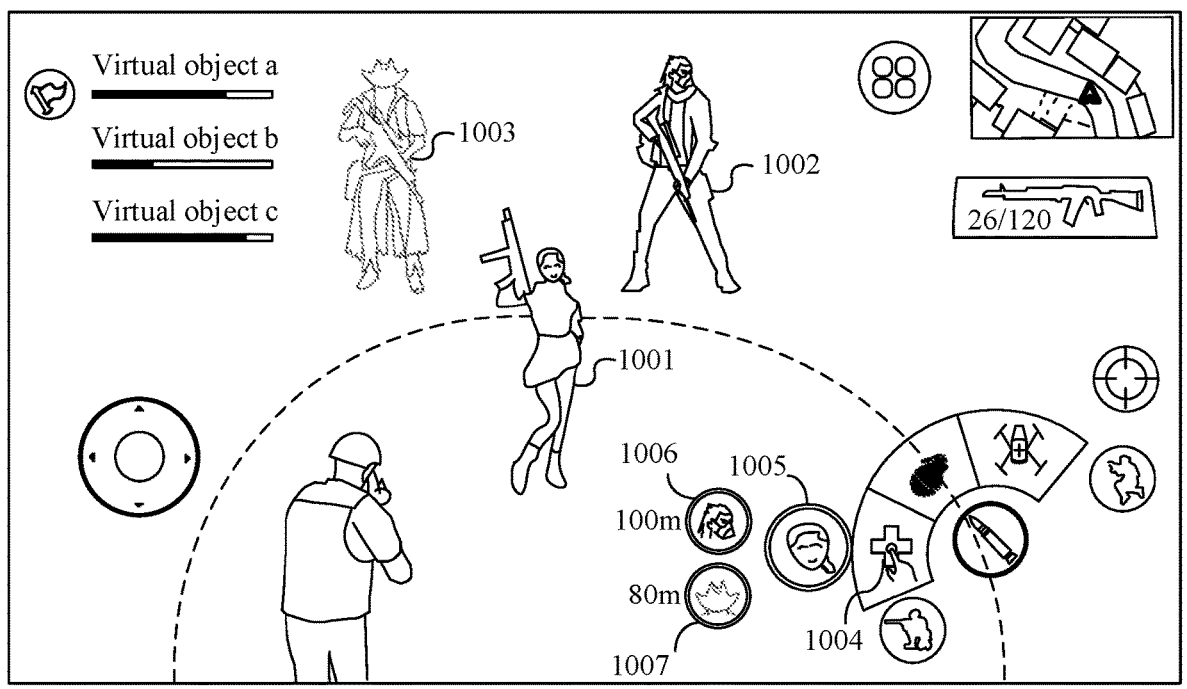
FIG. 10 is a schematic diagram of generation of a candidate object identifier according to another exemplary embodiment of the present disclosure.

Schematically, as shown in FIG. 10, a second virtual object a is located in an operation-performing region, a second virtual object b and a second virtual object c are located outside the operation-performing region, target attribute values of the second virtual object a, the second virtual object b, and the second virtual object c are all lower than an attribute value threshold, a virtual object 1001 is the second virtual object a, a virtual object 1002 is the second virtual object b, and a virtual object 1003 is the second virtual object c. Therefore, when a trigger operation on a target function control 1004 is received, an object identifier 1005 corresponding to the second virtual object a, an object identifier 1006 corresponding to the second virtual object a, and an object identifier 1007 corresponding to the second virtual object a are generated. A generation size of the object identifier 1005 is larger than those of the object identifier 1006 and the object identifier 1007, a generation region of the object identifier 1005 is different from those of the object identifier 1006 and the object identifier 1007, and a second object distance is generated on a side of the object identifier 1006 and a side of the object identifier 1007.

In the foregoing embodiment, a second candidate object identifier and a second object distance of a second candidate virtual object are generated. because the second candidate virtual object is a virtual object outside an operation-performing region, and a target attribute value of the second candidate virtual object is lower than an attribute value threshold, the second object distance can be obtained intuitively, thereby helping to determine movement of the second candidate virtual object when the second object distance changes, improving the efficiency of positioning the second candidate virtual object, reducing computing time required for achieving such a result, and saving computing resources.

In some embodiments, the determining, in response to a selection operation on the candidate object identifiers, that a selected candidate object identifier is a target object identifier, and controlling the first virtual object to perform the target operation on a target virtual object corresponding to the target object identifier further includes:

Step 905: Obtain current position information of the target virtual object in response to a selection operation for the target object identifier on the second candidate object identifiers.

When receiving the selection operation for the target object identifier on the second candidate object identifiers, the terminal obtains the current position information of the target virtual object, so as to control the first virtual object to perform the target operation based on the current position information.

Step 906: Control, based on the current position information, the first virtual object to move toward the target virtual object.

Because the target virtual object is located outside the operation-performing region, before controlling the first virtual object to perform the target operation, the terminal automatically controls the first virtual object to move to a current position of the target virtual object.

Step 907: When the target virtual object is located in the operation-performing region, control, based on the current position information, the first virtual object to perform the target operation on the target virtual object.

When controlling the first virtual object to move to the position of the target virtual object, the terminal detects a distance between the first virtual object and the target virtual object in real time. When detecting that the target virtual object is located in the operation-performing region, the terminal performs the target operation on the target virtual object based on the current position information of the second target virtual object, avoiding the need for the user to manually control the first virtual object to move to the target virtual object outside the operation-performing region, thereby improving the operation-performing efficiency.

In this embodiment, based on current position information, a first virtual object is controlled to move toward a target virtual object. When the target virtual object is located in an operation-performing region, based on the current position information, the first virtual object is controlled to perform a target operation on the target virtual object. Therefore, movement of the first virtual object can be automatically controlled, so that the target virtual object is located in the operation-performing region, without the need for a user to manually control the movement of the first virtual object and adjust the operation-performing region, so as to perform the target operation on the target virtual object, which improves the efficiency and smoothness of human-computer interaction.

In some embodiments, the trigger operation on the target function control includes a long-press operation, a selection operation on the target object identifier includes a drag operation, a position of a dragging end point of the drag operation is consistent with a position of the target object identifier, and the long-press operation and the drag operation are consecutive operations.

A start point of the drag operation may be a position of the target function control. After the target function control is long-pressed, the drag operation is performed toward a position of the target object identifier, thereby performing the selection operation for the target object identifier.

In this embodiment, through a long-press operation and a drag operation, a selection operation for a target object identifier is performed conveniently and quickly, which improves the efficiency and smoothness of human-computer interaction.

In some embodiments, the trigger operation on the target function control is configured to trigger generation of a position-selection-performing control in addition to triggering display of the candidate object identifier, and the position-selection-performing control is configured to determine an operation-performing position. The operation-performing position refers to a position on which the target operation acts, and the generating candidate object identifiers of the candidate virtual objects includes: determining a control display region of the position-selection-performing control, and generating the candidate object identifiers in a generation region other than the control display region.

The user may manually adjust the operation-performing position of the target operation and perform the target operation through the position-selection-performing control of the operation. The operation-performing position may be a region or a specific position, and may also be referred to as an operation-performing region in the case of being a region. A display position of the candidate object identifier is outside a control display region of the position-selection-performing control of the operation.

Figure 11:
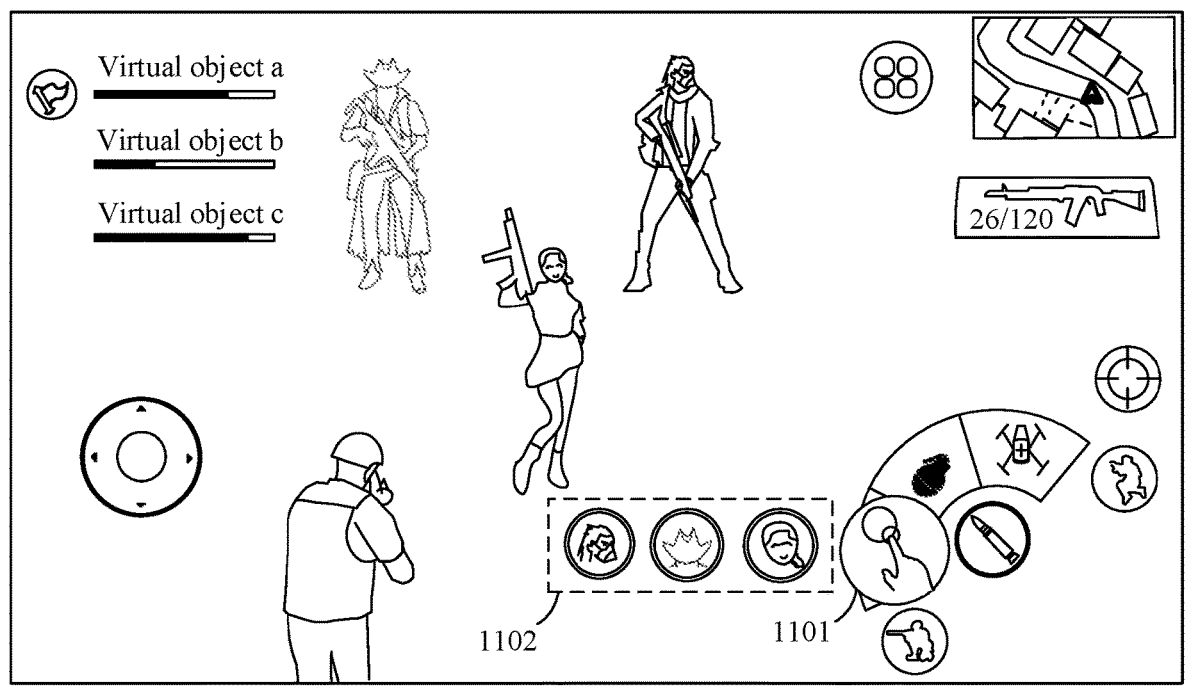
FIG. 11 is a schematic diagram of generation of a candidate object identifier according to another exemplary embodiment of the present disclosure.

As shown in FIG. 11, when receiving a trigger operation on a target function control, the terminal triggers generation of a position-selection-performing control of the operation and a candidate object identifier. A control display region 1101 of the position-selection-performing control of the operation and a candidate object identifier 1102 are generated in different regions.

In this embodiment, a candidate object identifier is generated in a generation region other than a control display region, which reduces the conflict between a position of a candidate object identifier and a position of the control display region, reduces the conflict between positions, reduces the operation conflict, reduces the misoperation probability, and effectively avoids repeated operations resulting a waste of computing resources.

In some application scenarios, the second virtual object belonging to the same camp as the first virtual object does not exist in the virtual environment, and when no second virtual object exists, the target operation does not need to be performed.

In some embodiments, before the in response to a trigger operation on the target function control, generating object identifiers of second virtual objects with target attribute values satisfying a preset condition, the method further includes: obtaining a quantity of the second virtual objects in a virtual environment corresponding to the virtual environment screen; and monitoring the target attribute values of the second virtual objects when the quantity of the second virtual objects is greater than a quantity threshold.

The quantity threshold may be a default value or a value set by the user. When the second virtual object exists in the virtual environment, the terminal may monitor the target attribute value of the second virtual object.

Because the terminal monitors the target attribute values of the second virtual objects in the virtual environment in real time, the power consumption of the terminal is relatively large. In addition, when the quantity of the second virtual objects is relatively small, the user can usually accurately control the first virtual object to perform the target operation on the second virtual objects. Therefore, in this embodiment, the terminal is only triggered to detect the target attribute values of the second virtual objects when the quantity of the second virtual objects is greater than the quantity threshold. In this way, the target attribute values corresponding to the second virtual objects can be quickly grasped when the quantity of the second virtual objects is relatively large, and the target attribute values corresponding to the second virtual objects do not need to be detected in real time, which reduces the power consumption of the terminal, and reduces the waste of computing resources when detecting the target attribute values.

In some embodiments, the method further includes: stopping monitoring the target attribute values of the second virtual objects when the quantity of the second virtual objects is equal to or less than the quantity threshold.

In this embodiment, when the quantity of the second virtual objects is equal to or less than the quantity threshold, the monitoring of the target attribute values of the second virtual objects is stopped, thereby reducing the power consumption of the terminal.

Figure 12:
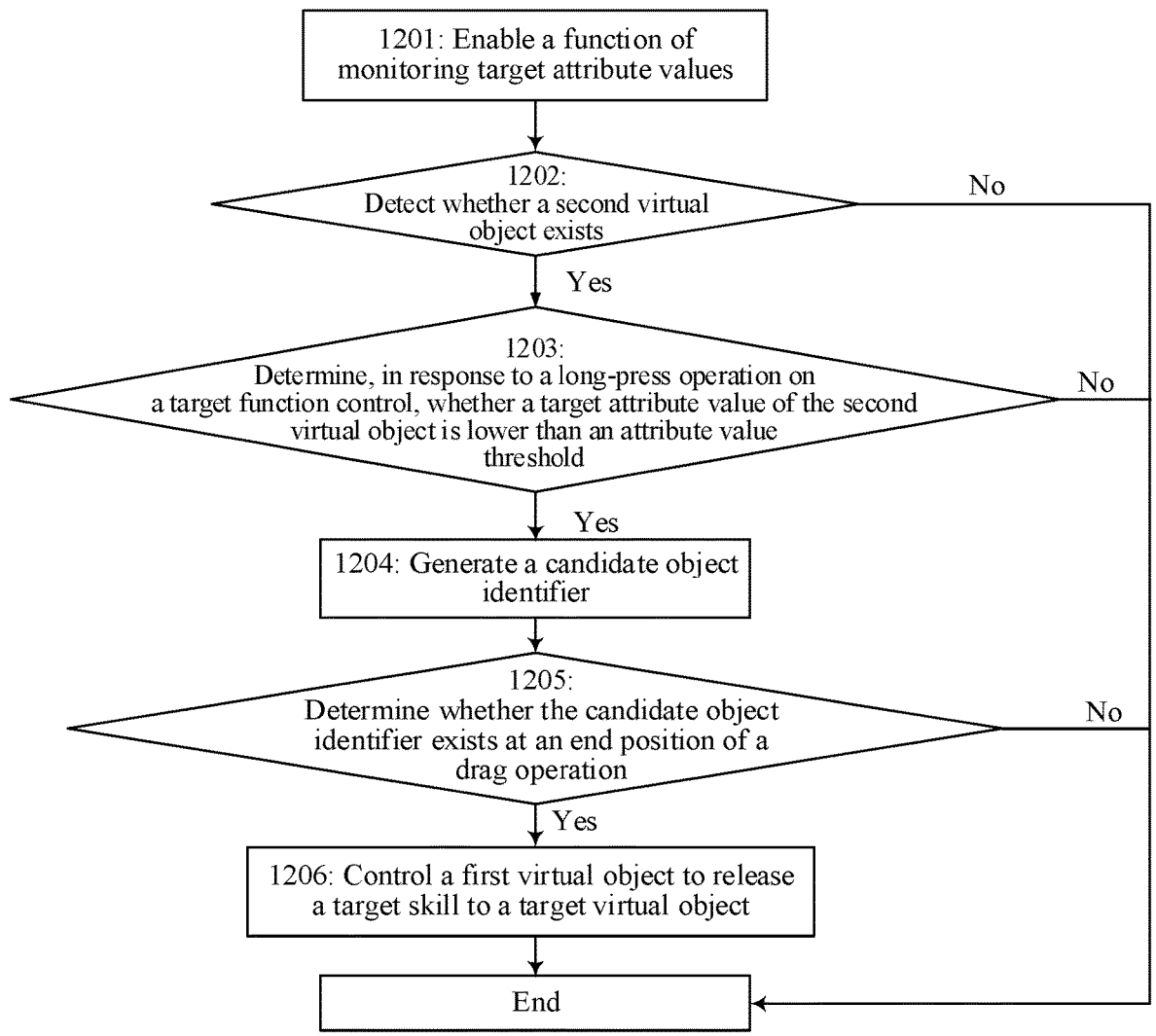
FIG. 12 is a flowchart of a virtual object control method according to another exemplary embodiment of the present disclosure.

In combination with the embodiments described above, in a schematic example, a virtual object control flow is shown in FIG. 12.

Step 1201: Enable a function of monitoring target attribute values.

Step 1202: Detect whether a second virtual object exists, and if yes, perform a step 1203.

Step 1203: Determine, in response to a long-press operation on a target function control, whether a target attribute value of the second virtual object being lower than an attribute value threshold exists, and if yes, perform a step 1204.

Step 1204: Generate a candidate object identifier.

Step 1205: Determine whether the candidate object identifier exists at an end position of a drag operation, and if yes, perform a step 1206.

Step 1206: Control a first virtual object to release a target skill to a target virtual object.

Figure 13:
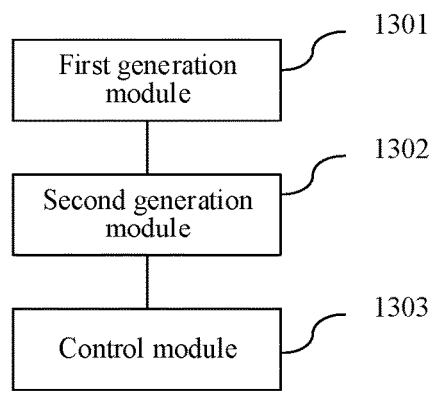
FIG. 13 is a structural block diagram of a virtual object control apparatus according to an exemplary embodiment of the present disclosure.

FIG. 13 is a structural block diagram of a virtual object control apparatus according to an exemplary embodiment of the present disclosure. The apparatus may be disposed in the first terminal 110 or the second terminal 130 in the implementation environment shown in FIG. 1 or another terminal in the implementation environment. The apparatus includes:

a first generation module 1301, configured to display a virtual environment screen and a target function control, a first virtual object and second virtual objects being generated in the virtual environment screen, the target function control being configured to trigger the first virtual object to perform a target operation corresponding to a target function, and the target operation being used for triggering change of a target attribute value of a second virtual object;

a second generation module 1302, configured to determine, in response to a trigger operation on the target function control, one or more second virtual objects with target attribute values satisfying a preset condition as one or more candidate virtual objects, and generate one or more candidate object identifiers of the one or more candidate virtual objects; and a control module 1303, configured to determine, in response to a selection operation on the candidate object identifiers, that a selected candidate object identifier is a target object identifier, and control the first virtual object to perform the target operation on a target virtual object corresponding to the target object identifier.

In this embodiment, when second virtual objects with target attribute values satisfying a preset condition exist, generation of corresponding candidate object identifiers can be triggered through a trigger operation on a target function control. During selection of the candidate object identifiers, a selected candidate object identifier is determined as a target object identifier, and a first virtual object is controlled to perform a target operation on a target virtual object, to change a target attribute value of the target virtual object. Therefore, the target operation is prevented from acting on a second virtual object that does not exist or acting on a second virtual object whose target attribute value does not need to be changed, and the waste of computing resources in a process of human-computer interaction is reduced. In addition, the user may trigger the target operation to be performed on the target virtual object by selecting the target object identifier, which simplifies a process of performing operations, improves the efficiency of performing the operations, and improves the smoothness of the human-computer interaction.

In some embodiments, the candidate virtual objects include first candidate virtual objects, and the second generation module 1302 includes:

a first obtaining unit, configured to obtain, in response to the trigger operation on the target function control, target attribute values of second virtual objects in an operation-performing region;

a first determining unit, configured to determine a second virtual object with a target attribute value being lower than an attribute value threshold as the first candidate virtual object;

a second determining unit, configured to determine a display position corresponding to each first candidate object identifier, the first candidate object identifier being an object identifier of each first candidate virtual object; and a first generation unit, configured to generate the first candidate object identifier at the display position.

In some embodiments, the second determining unit is further configured to:

obtain distances between the first candidate virtual objects and the first virtual object as a first object distance, and determine a generation priority of the first candidate object identifiers, the generation priority being determined based on at least one of the target attribute values of the second virtual objects, the first object distance, and a current game score of the first candidate virtual objects; and determine the display position corresponding to each first candidate object identifier based on the generation priority, a distance from the display position to the target function control being positively correlated with the generation priority.

In some embodiments, the apparatus further includes:

a receiving module, configured to receive an attribute value reply request transmitted by a server, the attribute value reply request being initiated by a terminal corresponding to a second virtual object through the server, and the attribute value reply request including a request object identifier.

In some embodiments, the second determining unit is further configured to:

determine the request object identifier as a highest generation priority when the trigger operation on the target function control is received within a preset duration after the attribute value reply request is received, and the request object identifier belongs to the first candidate object identifiers.

In some embodiments, the first generation unit is further configured to:

generate the first candidate object identifier and object information of the first candidate virtual object at the display position, the object information including at least one of: the target attribute value, the first object distance, and the current game score.

In some embodiments, the control module 1303 further includes:

a second obtaining unit, configured to determine, in response to a selection operation on the first candidate object identifiers, that a selected first candidate object identifier is the target object identifier, and obtain current position information of the target virtual object corresponding to the target object identifier; and a first control unit, configured to control, based on the current position information, the first virtual object to perform the target operation on the target virtual object.

In some embodiments, the candidate virtual object further includes a second candidate virtual object, and the second generation module 1302 further includes:

a third obtaining unit, configured to obtain, in response to the trigger operation on the target function control, target attribute values of second virtual objects outside the operation-performing region;

a third determining unit, configured to determine second virtual objects with target attribute values being lower than the attribute value threshold as the second candidate virtual objects; and a second generation unit, configured to obtain distances between the second candidate virtual objects and the first virtual object as a second object distance, and generate second candidate object identifiers of the second candidate virtual objects and the second object distance, the first candidate object identifiers and the second candidate object identifiers being generated in different manners or regions.

In some embodiments, the control module 1303 further includes:

a fourth obtaining unit, configured to obtain current position information of the target virtual object in response to a selection operation for the target object identifier on the second candidate object identifiers;

a second control unit, configured to control, based on the current position information, the first virtual object to move toward the target virtual object; and a third control unit, configured to, when the target virtual object is located in the operation-performing region, control, based on the current position information, the first virtual object to perform the target operation on the target virtual object.

In some embodiments, the trigger operation on the target function control includes a long-press operation, a selection operation on the target object identifier includes a drag operation, a position of a dragging end point of the drag operation is consistent with a position of the target object identifier, and the long-press operation and the drag operation are consecutive operations.

In some embodiments, the trigger operation on the target function control is further used for triggering display of a position-selection-performing control; and in some embodiments, the second generation module 1302 is further configured to:

determine a control display region of the position-selection-performing control, and generate the candidate object identifiers in a generation region other than the control display region.

In some embodiments, the apparatus further includes:

an obtaining module, configured to obtain a quantity of the second virtual objects in the virtual environment;

a monitoring module, configured to monitor the target attribute values of the second virtual objects when the quantity of the second virtual objects is greater than a quantity threshold; and a stopping module, configured to stop monitoring the target attribute values of the second virtual objects when the quantity of the second virtual objects is equal to or less than the quantity threshold.

In conclusion, in the embodiments of the present disclosure, when candidate virtual objects with target attribute values satisfying a preset condition exists, generation of corresponding candidate object identifiers can be triggered through a trigger operation on a target function control. A user may further perform a selection operation for a target object identifier on the candidate object identifiers, and control a first virtual object to perform a target operation corresponding to a target function on a target virtual object, thereby changing a target attribute value of the target virtual object. Therefore, a target skill is prevented from being released to a second virtual object that does not exist or released to a second virtual object whose target attribute value does not need to be changed, a skill hit rate is increased, and the waste of skill resources is avoided. In addition, the user may trigger the target operation to be performed on the target virtual object by selecting the target object identifier, which simplifies a process of performing operations, and improves the operation efficiency.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
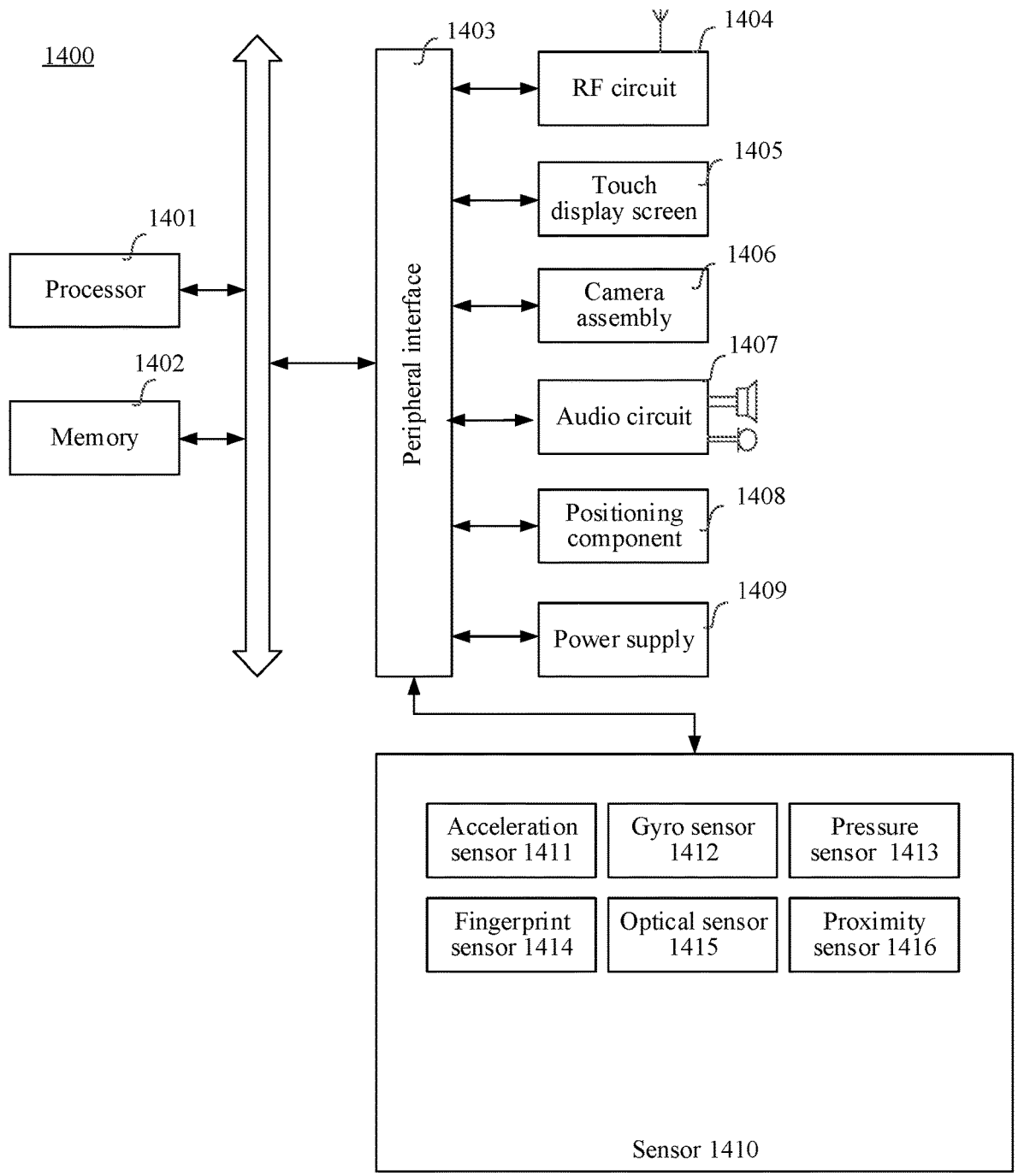
FIG. 14 is a structural block diagram of a terminal according to an exemplary embodiment of the present disclosure.

FIG. 14 is a structural block diagram of a terminal 1400 according to an exemplary embodiment of the present disclosure. The terminal 1400 may be a portable mobile terminal, such as: a smartphone, a tablet computer, a Moving Picture Experts Group Audio Layer III (MP3) player, or an MP4 player. The terminal 1400 may be further referred to as other names such as user equipment and a portable terminal.

Typically, the terminal 1400 includes: a processor 1401 and a memory 1402.

The processor 1401 may include one or more processing cores. For example, the processor may be a 4-core processor or an 8-core processor. The processor 1401 may be implemented by using at least one hardware form of digital signal processing (DSP), a field-programmable gate array (FPGA), and a programmable logic array (PLA). The processor 1401 may also include a main processor and a coprocessor. The main processor is a processor for processing data in a wake-up state, also referred to as a central processing unit (CPU). The coprocessor is a low power consumption processor configured to process data in a standby state. In some embodiments, the processor 1401 may be integrated with a graphics processing unit (GPU). The GPU is configured to render and draw content that needs to be generated on a display screen. In some embodiments, the processor 1401 may further include an artificial intelligence (AI) processor. The AI processor is configured to process a computing operation related to machine learning.

The memory 1402 may include one or more computer-readable storage media. The computer-readable storage medium may be tangible and non-transitory. The memory 1402 may further include a high-speed random access memory (RAM) and a non-volatile memory, such as one or more magnetic disk storage devices or flash storage devices. In some embodiments, the non-transitory computer-readable storage medium in the memory 1402 is configured to store at least one instruction, and the at least one instruction being configured to be executed by the processor 1401 to implement the method provided in the embodiments of the present disclosure.

In some embodiments, the terminal 1400 may include: a peripheral interface 1403 and at least one peripheral. Specifically, the peripheral includes: at least one of a radio frequency (RF) circuit 1404, a touch display screen 1405, a camera assembly 1406, an audio circuit 1407, a positioning component 1408, and a power supply 1409.

The peripheral interface 1403 may be configured to connect at least one peripheral device related to input/output (I/O) to the processor 1401 and the memory 1402. In some embodiments, the processor 1401, the memory 1402, and the peripheral interface 1403 are integrated on the same chip or the same circuit board. In some other embodiments, any one or two of the processors 1401, the memory 1402, and the peripheral interface 1403 may be implemented on a separate chip or circuit board, which is not limited in this embodiment.

The RF circuit 1404 is configured to receive and transmit an RF signal, which is also referred to as an electromagnetic signal. The RF circuit 1404 communicates with a communication network and other communication devices through the electromagnetic signal. The RF circuit 1404 converts an electrical signal into an electromagnetic signal for transmission, or converts a received electromagnetic signal into an electrical signal. In some embodiments, the RF circuit 1404 includes: an antenna system, an RF transceiver, one or more amplifiers, a tuner, an oscillator, a digital signal processor, a codec chipset, a user identity module card, and the like. The RF circuit 1404 may communicate with other terminals through at least one wireless communication protocol. The wireless communication protocol includes but is not limited to: a world wide web, a metropolitan area network, an intranet, generations of mobile communication networks (2G, 3G, 4G, and 5G), a wireless local area network and/or a wireless fidelity (WiFi) network. In some embodiments, the RF circuit 1404 may further include a circuit related to near field communication (NFC). This is not limited in the present disclosure.

The touch display screen 1405 is configured to generate a UI. The UI may include a graph, a text, an icon, a video, and any combination thereof. The touch display screen 1405 also has a capability of collecting a touch signal on or above a surface of the touch display screen 1405. The touch signal may be used as a control signal to be inputted to the processor 1401 for processing. The touch display screen 1405 is configured to provide a virtual button and/or a virtual keyboard, which is also referred to as a soft button and/or a soft keyboard. In some embodiments, there may be one touch display screen 1405, disposed on a front panel of the terminal 1400. In some other embodiments, there may be at least two touch display screens 1405, disposed on different surfaces of the terminal 1400 respectively or in a folded design. In still some other embodiments, the touch display screen 1405 may be a flexible display screen, disposed on a curved surface or a folded surface of the terminal 1400. Even, the touch display screen 1405 may be further set in a non-rectangular irregular pattern, namely, a special-shaped screen. The touch display screen 1405 may be made of materials such as a liquid crystal display (LCD), and an organic light-emitting diode (OLED).

The camera assembly 1406 is configured to capture images or videos. In some embodiments, the camera component 1406 includes a front-facing camera and a rear-facing camera. Generally, the front-facing camera is configured to implement a video call or self-portrait. The rear-facing camera is configured to capture a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera assembly 1406 may further include a flash. The flash may be a single color temperature flash or a double color temperature flash. The double color temperature flash refers to a combination of a warm light flash and a cold light flash, and may be used for light compensation under different color temperatures.

The audio circuit 1407 is configured to provide an audio interface between a user and the terminal 1400. The audio circuit 1407 may include a microphone and a speaker. The microphone is configured to collect sound waves from a user and an environment and convert the sound waves into electrical signals that are inputted to the processor 1401 for processing or to the RF circuit 1404 for voice communication. For purposes of stereo collection or noise reduction, there may be a plurality of microphones, which are respectively arranged at different parts of the terminal 1400. The microphone may be alternatively a microphone array or an omnidirectional acquisition microphone. The speaker is configured to convert the electrical signals from the processor 1401 or the RF circuit 1404 into sound waves. The speaker may be a thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 1407 may further include an earphone jack.

The positioning component 1408 is configured to position a current geographical position of the terminal 1400 to implement navigation or location based service (LBS). The positioning component 1408 may be a positioning component based on the US Global Positioning System (GPS), Chinese Beidou system, or Russian Galileo system.

The power supply 1409 is configured to supply power to components in the terminal 1400. The power supply 1409 may be an alternating current, a direct current, a disposable battery, or a rechargeable battery. When the power supply 1409 includes a rechargeable battery, the rechargeable battery may be a wired charging battery or a wireless charging battery. The wired charging battery is a battery charged through a wired line, and the wireless charging battery is a battery charged through a wireless coil. The rechargeable battery may also be configured to support fast charge technology.

In some embodiments, the terminal 1400 further includes one or more sensors 1410. The one or more sensors 1410 include but are not limited to: an acceleration sensor 1411, a gyro sensor 1412, a pressure sensor 1413, a fingerprint sensor 1414, an optical sensor 1415, and a proximity sensor 1416.

The acceleration sensor 1411 may detect the magnitude of acceleration on three coordinate axes of a coordinate system established with the terminal 1400. For example, the acceleration sensor 1411 may be configured to detect the components of gravitational acceleration on three coordinate axes. The processor 1401 may control, according to a gravity acceleration signal acquired by the acceleration sensor 1411, the touch display screen 1405 to generate the UI in a transverse view or a longitudinal view. The acceleration sensor 1411 may also be configured to collect game or user motion data.

The gyroscope sensor 1412 may detect a body direction and a rotation angle of the terminal 1400, and the gyroscope sensor 1412 may collect a 3D motion of the terminal 1400 by a user in cooperation with the acceleration sensor 1411. The processor 1401 may implement the following functions according to the data collected by the gyro sensor 1412: motion sensing (for example, change of the UI based on a tilt operation of the user), image stabilization during photographing, game control, and inertial navigation.

The pressure sensor 1413 may be disposed on a side frame of the terminal 1400 and/or a lower layer of the touch display screen 1405. When the pressure sensor 1413 is disposed at the side frame of the terminal 1400, a holding signal of the user on the terminal 1400 may be detected, and left/right hand identification and a quick action may be performed according to the holding signal. When the pressure sensor 1413 is disposed at the lower layer of the touch display screen 1405, an operable control in the UI interface can be controlled according to a pressure operation of the user on the touch display screen 1405. The operable control includes at least one of a button control, a scroll-bar control, an icon control, and a menu control.

The fingerprint sensor 1414 is configured to collect a fingerprint of a user to identify the identity of the user according to the collected fingerprint. Upon recognizing the identity of the user as a trusted identity, the user is authorized by the processor 1401 to perform related sensitive operations including unlocking the screen, viewing encrypted information, downloading software, paying and changing settings, and the like. The fingerprint sensor 1414 may be arranged on the front, back, or side of the terminal 1400. When a physical button or a vendor logo is arranged on the terminal 1400, the fingerprint sensor 1414 may be integrated with the physical button or the vendor logo.

The optical sensor 1415 is configured to collect ambient light intensity. In an embodiment, the processor 1401 may control the display brightness of the touch display screen 1405 according to the ambient light intensity acquired by the optical sensor 1415. Specifically, when the ambient light intensity is relatively high, the display brightness of the touch display screen 1405 is increased, and when the ambient light intensity is relatively low, the display brightness of the touch display screen 1405 is reduced. In another embodiment, the processor 1401 may also dynamically adjust camera parameters of the camera assembly 1406 according to the ambient light intensity collected by the optical sensor 1414.

The proximity sensor 1416, also referred to as a distance sensor, is generally disposed on the front surface of the terminal 1400. The proximity sensor 1416 is configured to collect a distance between the user and a front surface of the terminal 1400. In an embodiment, when the proximity sensor 1416 detects that the distance between the user and the front surface of the terminal 1400 gradually becomes small, the touch display screen 1405 is controlled by the processor 1401 to switch from a screen-on state to a screen-off state. When the proximity sensor 1416 detects that the distance between the user and the front surface of the terminal 1400 gradually increases, the touch display screen 1401 is controlled by the processor 1405 to switch from the screen-off state to the screen-on state.

A person skilled in the art may understand that the structure shown in FIG. 14 does not constitute a limitation to the terminal 1400, and the terminal may include more components or fewer components than those shown in the figure, or some components may be combined, or a different component deployment may be used.

An embodiment of the present disclosure further provides a computer-readable storage medium, storing at least one instruction, the at least one instruction being loaded and executed by a processor to implement the virtual object control method described in the foregoing embodiments.

According to an aspect of the present disclosure, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to perform the virtual object control method provided in the example embodiments of the foregoing aspect.

A person skilled in the art is to be aware that in the one or more examples, the functions described in the embodiments of the present disclosure may be implemented by using hardware, software, firmware, or any combination thereof. When implemented by using software, the functions can be stored in a computer-readable storage medium or can be used as one or more instructions or code in a computer-readable storage medium for transmission. The computer-readable storage medium includes a computer storage medium and a communication medium, the communication medium including any medium that enables a computer program to be transmitted from one place to another. The storage medium may be any available medium accessible to a general-purpose or dedicated computer.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A virtual object control method, performed by a computer device, the method comprising:
   displaying a virtual environment screen and a target function control, the virtual environment screen comprising a first virtual object and second virtual objects, the target function control being configured to trigger the first virtual object to perform a target operation corresponding to a target function, and the target operation being used for triggering change of a target attribute value of a second virtual object;
   determining, in response to a trigger operation on the target function control, one or more second virtual objects with target attribute values satisfying a preset condition as one or more candidate virtual objects, and displaying one or more candidate object identifiers of the one or more candidate virtual objects; and
   determining, in response to a selection operation on one of the one or more candidate object identifiers, that a selected candidate object identifier is a target object identifier, and controlling the first virtual object to perform the target operation on a target virtual object corresponding to the target object identifier,
   wherein a selection operation on the target object identifier comprises a drag operation with a dragging end point consistent with a position of the target object identifier, and the trigger operation on the target function control and the drag operation are consecutive operations.

2. The method according to claim 1, wherein the one or more candidate virtual objects comprise a first candidate virtual object, and the determining, in response to a trigger operation on the target function control, one or more second virtual objects with target attribute values satisfying a preset condition as one or more candidate virtual objects, and displaying one or more candidate object identifiers of the one or more candidate virtual objects comprises:
- obtaining, in response to the trigger operation on the target function control, target attribute values of second virtual objects in an operation-performing region;
- determining a second virtual object with a target attribute value being lower than an attribute value threshold as the first candidate virtual object;
- determining a display position corresponding to a first candidate object identifier of the first candidate virtual object; and
- displaying the first candidate object identifier at the display position.

3. The method according to claim 2, wherein the determining a display position corresponding to the first candidate object identifier comprises:
- obtaining distances between the first candidate virtual object and the first virtual object as a first object distance;
- determining a generation priority of the first candidate object identifier based on at least one of: the target attribute value of the first candidate virtual object, the first object distance, or a current game score of the first candidate virtual object; and
- determining the display position corresponding to the first candidate object identifier based on the generation priority, a distance from the display position to the target function control being positively correlated with the generation priority.

4. The method according to claim 3, further comprising:
- receiving an attribute value reply request transmitted by a server, the attribute value reply request being initiated by a terminal corresponding to a second virtual object through the server, and the attribute value reply request comprising a request object identifier, wherein
- the determining a generation priority of the first candidate object identifier comprises:
  - determining the request object identifier as a highest generation priority when the trigger operation on the target function control is received within a preset duration after the attribute value reply request is received, and the request object identifier belongs to the first candidate object identifier.

5. The method according to claim 3, wherein the displaying the first candidate object identifier at the display position comprises:
- displaying the first candidate object identifier and object information of the first candidate virtual object at the display position, the object information comprising at least one of: the target attribute value, the first object distance, and the current game score.

6. The method according to claim 2, wherein the determining, in response to a selection operation on one of the one or more candidate object identifiers, that a selected candidate object identifier is a target object identifier, and controlling the first virtual object to perform the target operation on a target virtual object corresponding to the target object identifier comprises:
- determining, in response to a selection operation on first candidate object identifiers, that a selected first candidate object identifier is the target object identifier, and
- obtaining current position information of the target virtual object corresponding to the target object identifier; and
- controlling, based on the current position information, the first virtual object to perform the target operation on the target virtual object.

7. The method according to claim 2, wherein the candidate virtual objects further comprise a second candidate virtual object, and the determining, in response to a trigger operation on the target function control, one or more second virtual objects with target attribute values satisfying a preset condition as one or more candidate virtual objects, and displaying one or more candidate object identifiers of the one or more candidate virtual objects further comprises:
- obtaining, in response to the trigger operation on the target function control, target attribute values of second virtual objects outside the operation-performing region;
- determining a second virtual object with target attribute value being lower than the attribute value threshold as the second candidate virtual object;
- obtaining a distance between the second candidate virtual object and the first virtual object as a second object distance; and
- displaying a second candidate object identifier of the second candidate virtual object based on the second object distance, the first candidate object identifier and the second candidate object identifier being displayed in different manners or regions.

8. The method according to claim 7, wherein the determining, in response to a selection operation on one of the one or more candidate object identifiers, that a selected candidate object identifier is a target object identifier, and controlling the first virtual object to perform the target operation on a target virtual object corresponding to the target object identifier further comprises:
- obtaining current position information of the target virtual object in response to the selection operation for the target object identifier on the second candidate object identifiers;
- controlling, based on the current position information, the first virtual object to move toward the target virtual object; and
- when the target virtual object is located in the operation-performing region, controlling, based on the current position information, the first virtual object to perform the target operation on the target virtual object.

9. The method according to claim 1, wherein the trigger operation on the target function control comprises a long-press operation.

10. The method according to claim 1, wherein the trigger operation on the target function control is further used for triggering display of a position-selection-performing control; the position-selection-performing control is configured to determine an operation-performing position; the operation-performing position refers to a position on which the target operation acts; and
- the displaying one or more candidate object identifiers of the one or more candidate virtual objects comprises:
  - determining a control display region of the position-selection-performing control, and displaying the one or more candidate object identifiers in a region other than the control display region.

11. The method according to claim 1, wherein before the determining, in response to a trigger operation on the target function control, one or more second virtual objects with target attribute values satisfying a preset condition as one or more candidate virtual objects, and displaying one or more candidate object identifiers of the one or more candidate virtual objects, the method further comprises:
  obtaining a quantity of the second virtual objects in a virtual environment corresponding to the virtual environment screen; and
  monitoring the target attribute values of the second virtual objects when the quantity of the second virtual objects is greater than a quantity threshold.

12. The method according to claim 11, further comprising:
  stopping monitoring the target attribute values of the second virtual objects when the quantity of the second virtual objects is equal to or less than the quantity threshold.

13. A virtual object control apparatus, comprising:
  a processor and a memory, the memory storing at least one instruction, at least one program, a code set, or an instruction set, the at least one instruction, the at least one program, the code set, or the instruction set being loaded and executed by the processor to implement:
  displaying a virtual environment screen and a target function control, the virtual environment screen comprising a first virtual object and second virtual objects, the target function control being configured to trigger the first virtual object to perform a target operation corresponding to a target function, and the target operation being used for triggering change of a target attribute value of a second virtual object;
  determining, in response to a trigger operation on the target function control, one or more second virtual objects with target attribute values satisfying a preset condition as one or more candidate virtual objects, and displaying one or more candidate object identifiers of the one or more candidate virtual objects; and
  determining, in response to a selection operation on one of the one or more candidate object identifiers, that a selected candidate object identifier is a target object identifier, and controlling the first virtual object to perform the target operation on a target virtual object corresponding to the target object identifier,
  wherein a selection operation on the target object identifier comprises a drag operation with a dragging end point consistent with a position of the target object identifier, and the trigger operation on the target function control and the drag operation are consecutive operations.

14. The apparatus according to claim 13, wherein the one or more candidate virtual objects comprise a first candidate virtual object, and the determining, in response to a trigger operation on the target function control, one or more second virtual objects with target attribute values satisfying a preset condition as one or more candidate virtual objects, and displaying one or more candidate object identifiers of the one or more candidate virtual objects comprises:
  obtaining, in response to the trigger operation on the target function control, target attribute values of second virtual objects in an operation-performing region;
  determining a second virtual object with a target attribute value being lower than an attribute value threshold as the first candidate virtual object;
  determining a display position corresponding to a first candidate object identifier of the first candidate virtual object; and
  displaying the first candidate object identifier at the display position.

15. The apparatus according to claim 14, wherein the determining a display position corresponding to the first candidate object identifier comprises:
  obtaining distances between the first candidate virtual object and the first virtual object as a first object distance;
  determining a generation priority of the first candidate object identifier based on at least one of: the target attribute value of the first candidate virtual object, the first object distance, or a current game score of the first candidate virtual object; and
  determining the display position corresponding to the first candidate object identifier based on the generation priority, a distance from the display position to the target function control being positively correlated with the generation priority.

16. The apparatus according to claim 15, wherein the processor is further configured to perform:
  receiving an attribute value reply request transmitted by a server, the attribute value reply request being initiated by a terminal corresponding to a second virtual object through the server, and the attribute value reply request comprising a request object identifier, wherein
  the determining a generation priority of the first candidate object identifier comprises:
  determining the request object identifier as a highest generation priority when the trigger operation on the target function control is received within a preset duration after the attribute value reply request is received, and the request object identifier belongs to the first candidate object identifier.

17. The apparatus according to claim 15, wherein the displaying the first candidate object identifier at the display position comprises:
  displaying the first candidate object identifier and object information of the first candidate virtual object at the display position, the object information comprising at least one of: the target attribute value, the first object distance, and the current game score.

18. The apparatus according to claim 14, wherein the determining, in response to a selection operation on one of the one or more candidate object identifiers, that a selected candidate object identifier is a target object identifier, and controlling the first virtual object to perform the target operation on a target virtual object corresponding to the target object identifier comprises:
  determining, in response to a selection operation on first candidate object identifiers, that a selected first candidate object identifier is the target object identifier, and obtaining current position information of the target virtual object corresponding to the target object identifier; and
  controlling, based on the current position information, the first virtual object to perform the target operation on the target virtual object.

19. The apparatus according to claim 14, wherein the candidate virtual objects further comprise a second candidate virtual object, and the determining, in response to a trigger operation on the target function control, one or more second virtual objects with target attribute values satisfying a preset condition as one or more candidate virtual objects, and displaying one or more candidate object identifiers of the one or more candidate virtual objects further comprises:
  obtaining, in response to the trigger operation on the target function control, target attribute values of second virtual objects outside the operation-performing region;

determining a second virtual object with target attribute value being lower than the attribute value threshold as the second candidate virtual object;

obtaining a distance between the second candidate virtual object and the first virtual object as a second object distance; and displaying a second candidate object identifier of the second candidate virtual object based on the second object distance, the first candidate object identifier and the second candidate object identifier being displayed in different manners or regions.

20. A non-transitory computer-readable storage medium, storing at least one computer program, the computer program being loaded and executed by a processor to implement:

displaying a virtual environment screen and a target function control, the virtual environment screen comprising a first virtual object and second virtual objects, the target function control being configured to trigger the first virtual object to perform a target operation corresponding to a target function, and the target operation being used for triggering change of a target attribute value of a second virtual object;

determining, in response to a trigger operation on the target function control, one or more second virtual objects with target attribute values satisfying a preset condition as one or more candidate virtual objects, and displaying one or more candidate object identifiers of the one or more candidate virtual objects; and determining, in response to a selection operation on one of the one or more candidate object identifiers, that a selected candidate object identifier is a target object identifier, and controlling the first virtual object to perform the target operation on a target virtual object corresponding to the target object identifier, wherein a selection operation on the target object identifier comprises a drag operation with a dragging end point consistent with a position of the target object identifier, and the trigger operation on the target function control and the drag operation are consecutive operations.

* * * * *